(12) United States Patent
Yang et al.

(10) Patent No.: US 12,368,521 B2
(45) Date of Patent: Jul. 22, 2025

(54) APPARATUS AND METHOD FOR MONITORING AN ANTENNA MODULE IN A WIRELESS COMMUNICATION SYSTEM

(71) Applicant: Samsung Electronics Co., Ltd., Gyeonggi-do (KR)

(72) Inventors: Minho Yang, Gyeonggi-do (KR); Junsuk Kim, Gyeonggi-do (KR); Junyoung Woo, Gyeonggi-do (KR); Chaeman Lim, Gyeonggi-do (KR); Euichang Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 356 days.

(21) Appl. No.: 17/877,189

(22) Filed: Jul. 29, 2022

(65) Prior Publication Data

US 2022/0368438 A1 Nov. 17, 2022

Related U.S. Application Data

(63) Continuation of application No. PCT/KR2021/012881, filed on Sep. 17, 2021.

(30) Foreign Application Priority Data

Sep. 17, 2020 (KR) .......................... 10-2020-0120031

(51) Int. Cl.
*H04B 17/318* (2015.01)
*H04B 17/18* (2015.01)

(52) U.S. Cl.
CPC ........... *H04B 17/318* (2015.01); *H04B 17/18* (2015.01)

(58) Field of Classification Search
CPC .... H04B 17/318; H04B 17/18; H04B 17/382; H04B 7/06; H04B 7/0602; H04B 7/0691; Y02D 30/70; H04W 36/08
See application file for complete search history.

(56) References Cited

U.S. PATENT DOCUMENTS 9,065,535 B2 6/2015 Wong et al.
11,146,321 B2 * 10/2021 Yoon ...................... H04B 7/088
(Continued)

FOREIGN PATENT DOCUMENTS

JP 4613646 1/2011
JP 4613646 B2 * 1/2011
(Continued)

OTHER PUBLICATIONS

PCT/ISA/210 Search Report issued on PCT/KR2021/012881, Jan. 13, 2022, pp. 4.
(Continued)

*Primary Examiner* — Yuwen Pan
*Assistant Examiner* — Swati Jain
(74) *Attorney, Agent, or Firm* — The Farrell Law Firm, P.C.

(57) ABSTRACT

Disclosed is a pre-5G or 5G communication system for supporting higher data rates beyond 4G communication system such as LTE. An electronic device including a plurality of antenna modules in a wireless communication system is provided. The electronic device includes a transceiver and a processor configured to identify a first RSRP value and a second RSRP value by using a first antenna module of the plurality of antenna modules; determine to monitor a second antenna module of the plurality of antenna modules based on the first RSRP value or the second RSRP value; and, in response to determining to monitor the second antenna module, monitor the second antenna module. The first RSRP value is measured from a first reference signal of a serving cell, and the second RSRP value is measured from a second reference signal of a neighboring cell.

10 Claims, 18 Drawing Sheets

(56) References Cited

U.S. PATENT DOCUMENTS

| | | | |
|---|---|---|---|
| 12,081,305 B2* | 9/2024 | Cui | H04B 17/309 |
| 2008/0220784 A1* | 9/2008 | Somasundaram | H04W 36/00837 |
| | | | 455/67.11 |
| 2013/0155890 A1* | 6/2013 | Bhattad | H04W 24/02 |
| | | | 370/252 |
| 2013/0309981 A1* | 11/2013 | Ngai | H04B 7/0608 |
| | | | 455/78 |
| 2015/0282196 A1* | 10/2015 | Kim | H04B 7/0608 |
| | | | 370/252 |
| 2018/0352461 A1* | 12/2018 | Guirguis | H04W 36/302 |
| 2019/0053193 A1* | 2/2019 | Park | H04W 76/27 |
| 2019/0208569 A1* | 7/2019 | Lee | H04B 7/0817 |
| 2020/0029229 A1* | 1/2020 | Harada | H04W 24/02 |
| 2020/0037383 A1* | 1/2020 | Rico Alvarino | H04W 72/0453 |
| 2020/0295895 A1* | 9/2020 | Wu | H04L 5/0007 |
| 2020/0305221 A1 | 9/2020 | Lee et al. | |
| 2021/0306888 A1* | 9/2021 | Kim | H04W 24/08 |
| 2022/0030479 A1* | 1/2022 | Jain | H04B 7/0602 |
| 2024/0023105 A1* | 1/2024 | Luo | H04W 72/21 |

FOREIGN PATENT DOCUMENTS

| | | | |
|---|---|---|---|
| KR | 10-2014-0111278 | 9/2014 | |
| KR | 10-2015-0022833 | 3/2015 | |
| KR | 10-2015-0112629 | 10/2015 | |
| KR | 10-2017-0097920 | 8/2017 | |
| WO | WO-2018084985 A1 * | 5/2018 | H04J 11/0093 |

OTHER PUBLICATIONS

PCT/ISA/237 Written Opinion issued on PCT/KR2021/012881, Jan. 13, 2022, pp. 4.

* cited by examiner

APPARATUS AND METHOD FOR MONITORING AN ANTENNA MODULE IN A WIRELESS COMMUNICATION SYSTEM

CROSS-REFERENCE TO RELATED APPLICATIONS

This application is a Bypass Continuation Application of International Application No. PCT/KR2021/012881, which was filed on Sep. 17, 2021 and is based on and claims priority under 35 U.S.C. § 119 to Korean Patent Application No. 10-2020-0120031, which was filed in the Korean Intellectual Property Office on Sep. 17, 2020, the entire disclosure of each of which is incorporated herein by reference.

BACKGROUND

1. Field

The disclosure relates generally to an apparatus and a method for an electronic device including a plurality of antenna modules to monitor the antenna modules in a wireless communication system.

2. Description of Related Art

To meet the increasing demand for wireless data traffic since deployment of $4^{th}$ generation (4G) communication systems, efforts have been made to develop an improved $5^{th}$ generation (5G) or pre-5G communication system. The 5G or pre-5G communication system may also be referred to as a beyond 4G network or a post long term evolution (LTE) system.

The 5G communication system is intended to be implemented in higher frequency (mmWave) bands, e.g., 60 GHz bands, to accomplish higher data rates. To decrease propagation loss of the radio waves and increase the transmission distance, beamforming, massive multiple-input multiple-output (MIMO), full dimensional MIMO (FD-MIMO), array antennas, analog beam forming, and large scale antenna techniques are being discussed for use in 5G communication systems.

In 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, etc.

In the 5G system, hybrid frequency shift keying (FSK) and quadrature amplitude modulation (FQAM) and sliding window superposition coding (SWSC) have been developed for advanced coding modulation (ACM), and filter bank multi carrier (FBMC), non-orthogonal multiple access (NOMA), and sparse code multiple access (SCMA) have been developed as advanced access technologies.

According to new radio (NR) standards of $3^{rd}$ generation partnership project (3GPP), a frequency band used for wireless communication may be divided into frequency range (FR) 1 and FR 2. The FR 1 may be indicated by Sub-6 GHz related to a band of 6 GHz or 7.125 GHz or lower, and the FR 2 may be indicated by Above-6 GHz related to a band of 6 GHz or 7.125 GHz or higher. A beamforming technique based on a frequency band of the FR 2 may be used to compensate for propagation loss by concentrating an antenna, gain.

In a 5G communication system, an electronic device may include one or a plurality of antenna arrays to use a beamforming technique. The electronic device may form a serving beam by using the beamforming technique to maintain optimal or effective channel quality by the one or plurality of antenna arrays. The serving beam may indicate a beam that is formed for wireless communication with a target electronic device. However, in a channel environment for wireless communication, an optimal serving beam should be selected, changed, or replaced based various factors such as movement of the electronic device, an obstacle, etc.

SUMMARY

The disclosure has been made to address at least the above-mentioned problems and/or disadvantages and to provide at least the advantages described below.

An aspect of the disclosure is to provide an apparatus and a method for adaptively monitoring a channel condition to select and/or change a serving beam in an electronic device.

Technical objects to be achieved by the disclosure are not limited to those described above, and other technical objects may be predicted within the range understood by those skilled in the technical field to which various embodiments suggested in the following descriptions belong.

According to an embodiment of the disclosure, an operating method is provided for an electronic device including a plurality of antenna modules in a wireless communication system. The operating method includes identifying a first reference signal received power (RSRP) value and a second RSRP value by using at least one first antenna module; determining to monitor at least one second antenna module, based on the first RSRP value or the second RSRP value; and, in response to determining to monitor the at least one second antenna module, monitoring the at least one second antenna module, and the first RSRP value may be measured from a reference signal of a serving cell, and the second RSRP value may be measured from a reference signal of a neighboring cell.

According to an embodiment of the disclosure, an electronic device is provided, which includes a transceiver; at least one sensor; a plurality of antenna modules; and at least one processor operatively connected with the transceiver and the at least one sensor, and the at least one processor may be configured to: identify a first RSRP value and a second RSRP value by using at least one first antenna module; determine to monitor at least one second antenna module based on the first RSRP value or the second RSRP value; and, in response to determining to monitor the at least one second antenna module, monitor the at least one second antenna module, and the first RSRP value may be measured from a reference signal of a serving cell, and the second RSRP value may be measured from a reference signal of a neighboring cell.

BRIEF DESCRIPTION OF DRAWINGS

The above and other aspects, features, and advantages of certain embodiments of the disclosure will be apparent from the following detailed description taken in conjunction with the accompanying drawings, in which.

DETAILED DESCRIPTION

Figure 1:
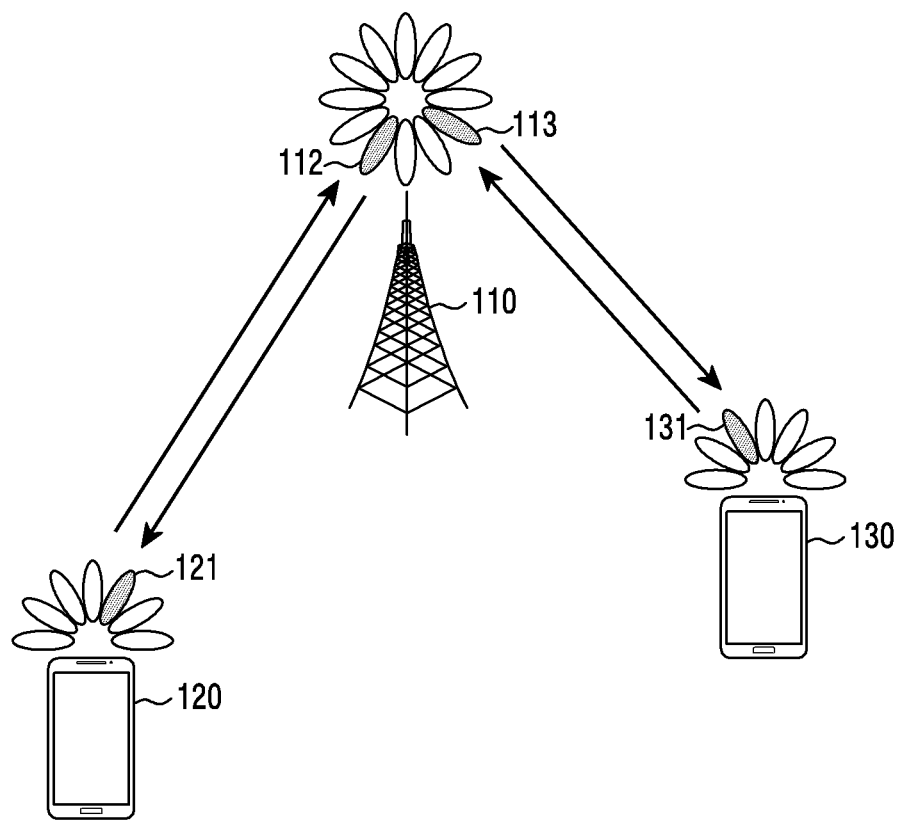
FIG. 1 illustrates a wireless communication system according to an embodiment.

Various terms are used throughout the disclosure to describe certain embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the specification, they should not be interpreted as excluding embodiments of the present disclosure.

In various embodiments of the disclosure described below, hardware-wise approach methods will be described by way of an example. However, various embodiments of the disclosure include technology using both hardware and software, and thus do not exclude software-based approach methods.

In accordance with an embodiment, an apparatus and a method are provided for dispersively managing a radio frequency (RF) module in a wireless communication system. For example, the disclosure describes techniques for using an RF module dispersively based on temperatures and performance of RF modules in a wireless communication system.

As used herein, terms indicating signals, terms indicating channels, terms indicating control information, terms indicating network entities, and terms indicating components of a device are merely examples for convenience of explanation. Accordingly, the disclosure is not limited to the terms described below, and other terms having the same technical meanings may be used.

The term "unit" or terms ending with suffixes "-er," and "-or" used in the following descriptions may refer to a unit processing at least one function or operation, and may be implemented by hardware, software, or a combination of hardware and software.

In addition, in the disclosure, the expression "exceeding" or "being less than" may be used to determine whether a specific condition is satisfied, fulfilled, but these are just for expressing one example and do not exclude the expression "being greater than or equal to" or "being less than or equal to". The condition described by "being greater than or equal to" may be substituted with "exceeding", the condition described by "being less than or equal to" may be substituted with "being less than", and the condition described by "being greater than or equal to and less than" may be substituted with "exceeding and less than or equal to".

In addition, the disclosure provides various embodiments by using terms used in some communication standards (e.g., 3GPP), but these embodiments are merely examples. Various embodiments of the disclosure may be easily modified and applied to other communication systems.

FIG. 1 illustrates a wireless communication system according to an embodiment.

Referring to FIG. 1, the wireless communication system includes a base station 110, a first terminal 120, and a second terminal 130 as some of nodes using a wireless channel. However, the wireless communication system may further include other base stations which are the same as or similar to the base station 110, in addition to the one base station 110.

The base station 110 may be a network infrastructure that provides wireless connection to the first terminal 120 and/or the second terminal 130. The base station 110 may have a coverage that is defined as a predetermined geographical region, based on a distance by which a signal can be transmitted. The base station 110 may also be referred to as an access point (AP), an eNodeB (eNB), a 5G node, a next generation nodeB (gNB), a wireless point, a transmission/reception point (TRP), or other term having the same technical meaning as the above-mentioned terms.

The first terminal 120 and/or the second terminal 130 may be a device that is used by a user, and may communicate with the base station 110 via a wireless channel.

At least one of the first terminal 120 or the second terminal 130 may be operated without user intervention. For example, at least one of the first terminal 120 or the second terminal 130 may performs machine type communication (MTC), and may not be carried by a user.

The first terminal 120 and/or the second terminal 130 may also be referred to as a user equipment (UE), a mobile station, a subscriber station, a remote terminal, a wireless terminal, a user device, or another term having the same technical meaning as the above-mentioned terms.

The base station 110, the first terminal 120, and the second terminal 130 may transmit and receive wireless signals in millimeter wave (mm Wave) bands (e.g., 28 GHz, 30 G-Hz, 38 GHz, or 60 GHz).

The base station 110, the first terminal 120, and the second terminal 130 may perform beamforming to enhance channel gain. The beamforming may include transmission beamforming and/or reception beamforming. That is, the base station 110, the first terminal 120, and the second terminal 130 may give directivity to a transmission signal and/or a reception signal. For example, the base station 110 and the terminals 120 and 130 may select serving beams 112, 113, 121, and 131 through a beam search or beam management procedure. After the serving beams 112, 113, 121, and 131 are selected, communication may be performed through resources that have a quasi co-located (QCL) relationship with resources in the selected serving beams 112, 113, 121, and 131.

A first antenna port and a second antenna port may be determined to have the QCL relationship if large-scale characteristics of a channel transmitting a symbol on the first antenna port can be inferred from a channel transmitting a symbol on the second antenna port. The large-scale characteristics may include at least one of a delay spread, a doppler spread, a doppler shift, an average gain, an average delay, or a spatial receiver parameter.

Figure 2:
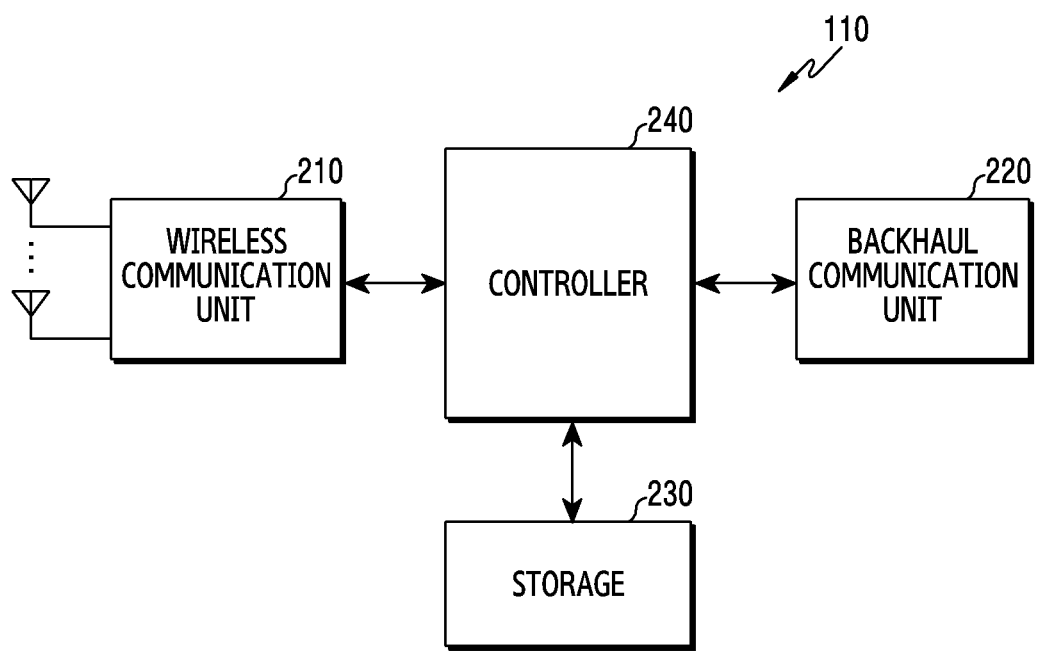
FIG. 2 illustrates a base station in a wireless communication system according to an embodiment.

FIG. 2 illustrates a base station in a wireless communication system according to an embodiment.

Referring to FIG. 2, the base station 110 includes a wireless communication unit 210, a backhaul communication unit 220, a storage 230, and a controller 240.

The wireless communication unit 210 may perform functions for transmitting/receiving signals via a wireless channel. For example, the wireless communication unit 210 may convert between a baseband (BB) signal and a bit stream according to a physical layer standard of a system. When transmitting data, the wireless communication unit 210 may generate complex symbols by encoding and modulating a transmission bit stream. In addition, when receiving data, the wireless communication unit 210 may restore a reception bit stream by demodulating and decoding received complex symbols.

The wireless communication unit 210 may up-convert a BB signal into an RF band signal, may transmit the signal via one or a plurality of antennas, and may down-convert an RF band signal received via one or a plurality of antennas into a BB signal. To achieve this, the wireless communication unit 210 may include at least one of a transmission filter, a reception filter, an amplifier, a mixer, an oscillator, a digital to analog converter (DAC), or an analog to digital converter (ADC). The wireless communication unit 210 may include one or a plurality of transmission/reception paths (or transmission/reception chains) and/or one or a plurality of reception paths (or reception chains). The wireless communication unit 210 may include at least one antenna array including a plurality of antenna elements.

In the hardware aspect, the wireless communication unit 210 may include a digital unit and an analog unit. The analog unit may include a plurality of sub-units according to operating power and operating frequency. The digital unit may include at least one processor (e.g., a digital signal processor (DSP)).

An entirety or part of the wireless communication unit 210, which transmits and receives signals as described above, may be referred to as a transmitter, a receiver, or a transceiver. In the following descriptions, transmitting and receiving via a wireless channel may include processing a transmission signal and/or a reception signal by the wireless communication unit 210.

The backhaul communication unit 220 may provide an interface for communicating with other nodes in a network. The backhaul communication unit 220 may convert a bit stream, which is transmitted from the base station to another node, into a physical signal, or may convert a physical signal transmitted from another node into a bit stream. The another node may be at least one of another access node, another base station, an upper node, or a core network.

The storage 230 may store data such as a basic program for operations of the base station, an application program, or configuration information. The storage 230 may be configured by a volatile memory a nonvolatile memory, or a combination of a volatile memory and a nonvolatile memory. In addition, the storage 230 may provide stored data to the controller 240 or at least one other component according to a request of the controller 240.

The controller 240 may control the overall operation of the base station. For example, the controller 240 may transmit and/or receive signals via the wireless communication unit 210 and/or the backhaul communication unit 220. The controller 240 may write and read out data on or from the storage 230. The controller 240 may perform a function of at least one protocol stack required by communication standards. According to another implementation example, the protocol stack may be included in the wireless communication unit 210, and the controller 240 may include at least one processor.

Figure 3:
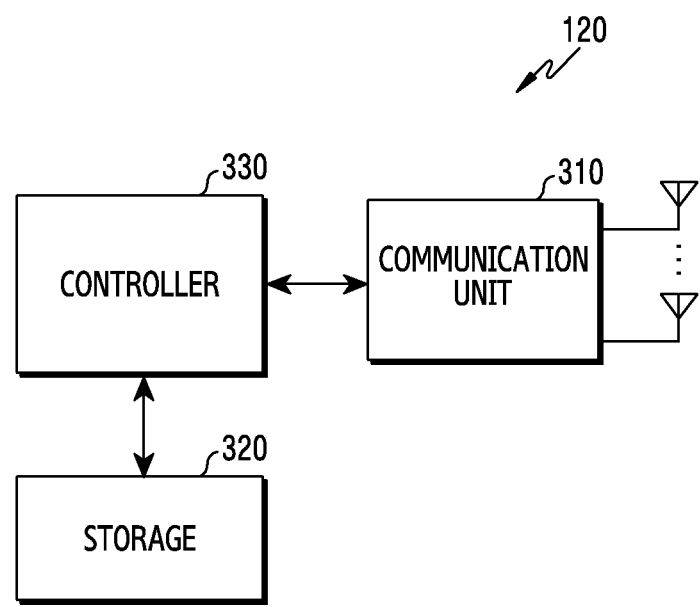
FIG. 3 illustrates a terminal in a wireless communication system according to an embodiment.

FIG. 3 illustrates a terminal in a wireless communication system according to an embodiment. Although FIG. 3 is described with reference to the first terminal 120, the configuration therein is also applicable to the second terminal 130.

Referring to FIG. 3, the first terminal 120 includes a communication unit 310, a storage 320, and a controller 330.

The communication unit 310 may perform functions for transmitting/receiving signals via a wireless channel. The communication unit 310 may convert between an RF band signal and a bit stream according to a physical layer standard of a system. When transmitting data, the communication unit 310 may generate complex symbols by encoding and modulating a transmission bit stream. In addition, when receiving data, the communication unit 310 may restore a reception bit stream by demodulating and decoding received complex symbols. The communication unit 310 may up-convert a BB signal into an RF band signal, and then may transmit the signal via one or a plurality of antennas, or may down-convert an RF band signal received via one or a plurality of antennas into a BB signal. For example, the communication unit 310 may include at least one of a transmission filter, a reception filter, an amplifier, a mixer, an oscillator, a DAC, or an ADC.

The communication unit 310 may include one or a plurality of transmission/reception paths (or transmission/reception chains) and/or one or a plurality of reception paths (or reception chains). The communication unit 310 may include at least one antenna array including a plurality of antenna elements. In the hardware aspect, the communication unit 310 may be configured by a digital circuit and an analog circuit (e.g., an RF integrated circuit (RFIC)). Herein, the digital circuit and the analog circuit may be implemented as a single package. In addition, the communication unit 310 may include a plurality of RF chains. Further, the communication unit 310 may perform beamforming.

The communication unit 310 may include a plurality of communication modules for processing signals of different frequency bands. The communication unit 310 may include a plurality of communication modules to support a plurality of different wireless access techniques. The different wireless access techniques may include wireless access techniques for Bluetooth low energy (BLE), Wireless Fidelity (Wi-Fi), WiFi Gigabyte (WiGig), or a cellular network (e.g., LTE), The different frequency bands may include a super high frequency (SHF) (e.g., 2.5 GHz or 5 GHz) band, a millimeter wave (e.g., 60 GHz) band.

An entirety or part of the communication unit 310, which transmits and receives signals as described above, may be referred to as a transmitter, a receiver, or a transceiver. In the following descriptions, transmitting and receiving via a wireless channel may include processing a transmission signal and/or reception signal by the communication unit 310.

The storage 320 may store data such as a basic program for operations of the terminal 120, an application program, configuration information, etc. The storage 320 may be configured by a volatile memory, a nonvolatile memory, or a combination of a volatile memory and a nonvolatile memory. The storage 320 may provide stored data to the controller 330 and/or one or a plurality of other components (e.g., the communication unit 310) according to a request of the controller 330.

The controller 330 may control overall operations of the terminal 120. For example, the controller 330 may transmit and/or receive signals via the communication unit 310. The controller 330 may write and read out data on or from the storage 320. The controller 330 may perform a function of at least one protocol stack required by communication standards. The controller 330 may include at least one processor or micro-processor, or may be a part of a processor. A part of the communication unit 310 and the controller 330 may be referred to as a communication processor. The controller 330 may include a mode determination unit for determining a mode of an RF module dispersively. The controller 330 may control the terminal 120 to perform operations according to various embodiments, some of which will be described below.

Figure 4:
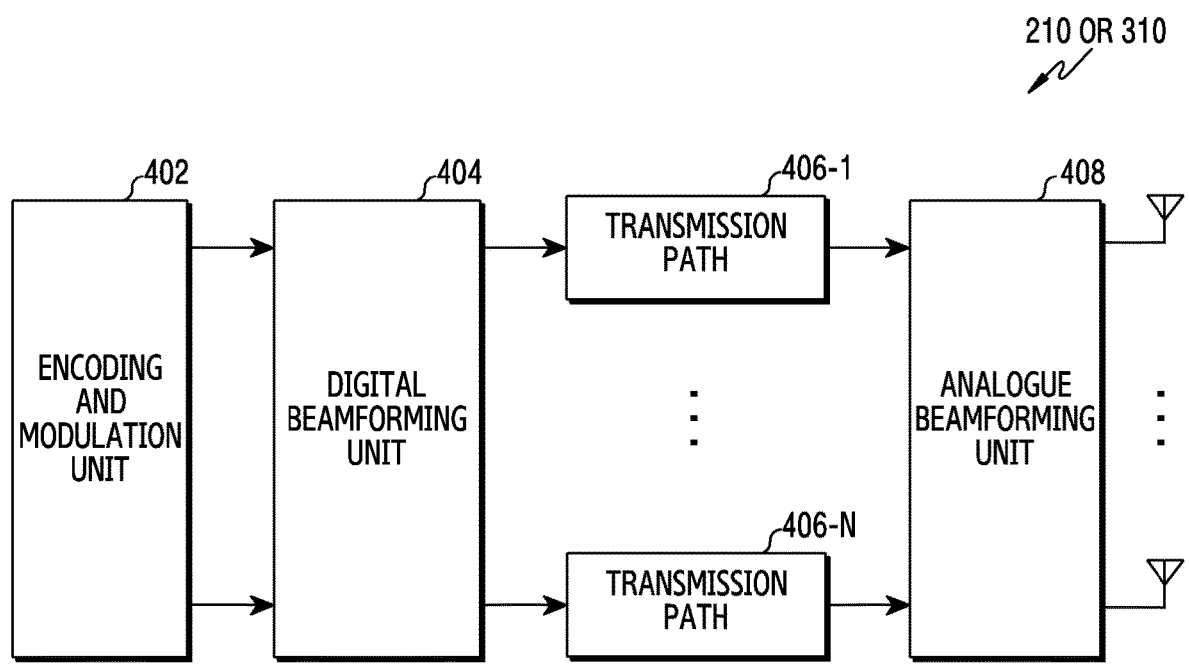
FIG. 4 illustrates a communication unit in a wireless communication system according to an embodiment.

FIG. 4 illustrates a communication unit in a wireless communication system according to an. For example, FIG. 4 illustrates components for performing beamforming as a part of the wireless communication unit 210 of FIG. 2 or the communication unit 310 of FIG. 3.

Referring to FIG. 4, the communication unit includes an encoding and modulation unit 402, a digital beamforming unit 404, a plurality of transmission paths 406-1 to 406-N (or transmission chains), and an analog beamforming unit 408.

The encoding and modulation unit 402 may encode and modulate a signal to be transmitted during a transmitting operation. Encoding the signal to be transmitted may include channel encoding. The encoding and modulation unit 402 may use at least one of a low density parity check (LDPC) code, a convolution code, or a polar code to perform channel encoding. The encoding and modulation unit 402 may generate encoding bits as modulation symbols through constellation mapping, which corresponds to one of a plurality of modulation schemes.

The digital beamforming unit 404 may perform beamforming with respect to a digital signal (e.g., modulation symbols). The digital beamforming unit 404 may multiply modulation symbols, which are output from the encoding and modulation unit 402, by beamforming weights, to perform beamforming. The beamforming weights may be used to change a size and a phase of a signal. The beamforming weight may also be referred to as a 'precoding matrix' or a 'precoder'.

The digital beamforming unit 404 may output the modulation symbols to which the beamforming weights are applied to the plurality of transmission paths 406-1 to 406-N (or transmission chains). In this case, according to a MIMO transmission technique, the modulation symbols may be multiplexed, or may be provided to the plurality of transmission paths 406-1 to 406-N. The same modulation symbol may be provided to the plurality of transmission paths 406-1 to 406-N.

The plurality of transmission paths 406-1 to 406-N may convert digitally beamformed digital signals into analog signals. The plurality of transmission paths 406-1 to 406-N may include some or all of an inverse fast Fourier transform (IFFT) calculation unit, a cyclic prefix (CP) insertion unit, a DAC, or a frequency up-conversion unit. The CP insertion unit is to perform orthogonal frequency division multiplexing (OFDM), and may be excluded when other physical layer methods (e.g., an FBMC) are applied. The plurality of transmission paths 406-1 to 406-N may provide independent signal processing processes with respect to a plurality of streams generated through digital beamforming. However, some of the components of the plurality of transmission paths 406-1 to 406-N may be used in common according to an implementation method.

The analog beamforming unit 408 may perform beamforming with respect to analog signals provided from the plurality of transmission paths 4064 to 406-N. For example, the analog beamforming unit 408 may perform analog beamforming by multiplying analog signals provided from the plurality of transmission paths 406-1 to 406-N by beamforming weights. The beamforming weights may be used to change a size and a phase of a signal.

According to a connection structure between the plurality of transmission paths 406-1 to 406-N and antennas, the analog beamforming unit 440 may be configured differently. The plurality of transmission paths 406-1 to 406-N may be connected with an antenna array, for example. The plurality of transmission paths 406-N to 406-N may be connected with one antenna array. The plurality of transmission paths 406-1 to 406-N may be adaptively connected with one antenna array or may be connected with two or more antenna arrays.

Figure 5:
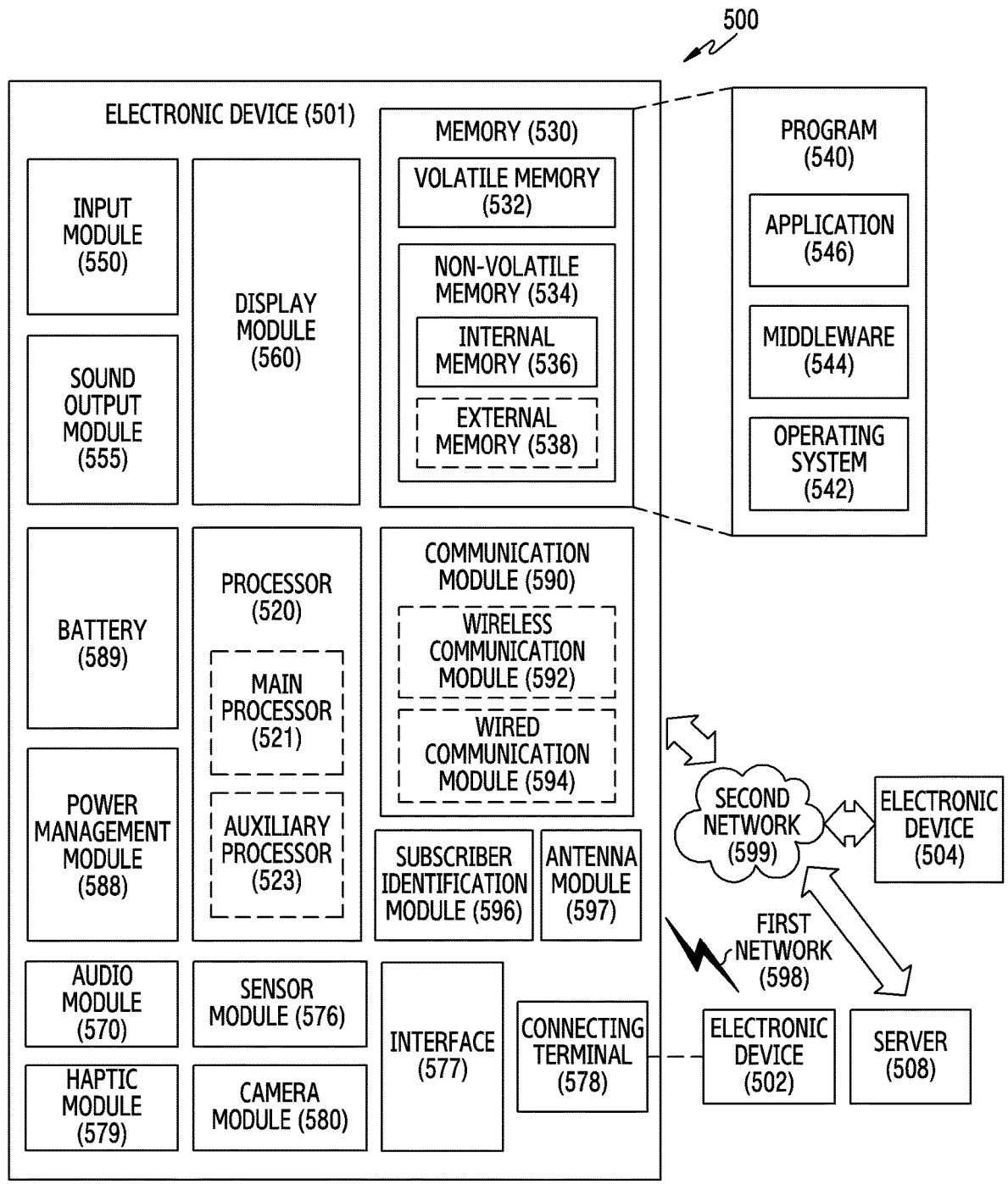
FIG. 5 illustrates an electronic device in a network environment in a wireless communication system according to an embodiment.

FIG. 5 illustrates an electronic device in a network environment in a wireless communication system according to an embodiment.

Referring to FIG. 5, the electronic device 501 in the network environment 500 may communicate with an electronic device 502 via a first network 598 (e.g., a short-range wireless communication network), or may communicate with an electronic device 504 or a server 508 via a second network 599 (e.g., a long-range wireless communication network). According to an embodiment, the electronic device 501 may communicate with the electronic device 504 via the server 508. According to an embodiment, the electronic device 501 may include a processor 520, memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In some embodiments, at least one (e.g., the display device 560 or the camera module 580) of the components may be omitted from the electronic device 501, or one or more other components may be added in the electronic device 501. In some embodiments, some of the components may be implemented as single integrated circuitry. For example, the sensor module 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520, and may perform various data processing or computation. According to one embodiment, as at least part of the data processing or computation, the processor 520 may load a command or data received from another component (e.g., the sensor module 576 or the communication module 590) in a volatile memory 532, process the command or the data stored in the volatile memory 532, and store resulting data in a film-volatile memory 534. According to an embodiment, the processor 520 may include a main processor 521 (e.g., a central processing device or an application processor), and an auxiliary processor 523 (e.g., a graphics processing device, an image signal processor (ISP), a sensor hub processor, or a communication processor) that is operable independently from, or in conjunction with, the main processor 521. Additionally or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an ISP or a communication processor) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by a component (e.g., the processor 520) of the electronic device 501, from the outside (e.g., a user) of the electronic device 501. The input device 550 may include, for example, a microphone, a mouse, a keyboard or a digital pen (for example, a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used to receive an incoming call. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding device. According to an embodiment, the display device 560 may include touch circuitry adapted to detect a touch, or sensor circuitry (e.g., a pressure sensor) adapted to measure the intensity of force incurred by a touch.

The audio module 570 may convert a sound into an electrical signal and vice versa, According to an embodiment, the audio module 570 may obtain the sound via the input device 550, or output the sound via the sound output device 555 or an external electronic device 502 (e.g., a speaker or a headphone) directly or wirelessly coupled with the electronic device 501.

The sensor module 576 may detect an operational state power or temperature) of the electronic device 501 or an environmental state (e.g., a state of a user) external to the electronic device, and then generate an electrical signal or data value corresponding to the detected state. According to an embodiment, the sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support at least one specified protocol to be used for the electronic device 501 to be coupled with the external electronic device (e.g., the electronic device 502) directly or wirelessly. According to an embodiment, the interface 577 may include, for example, a high definition multimedia interface (HDMI), a universal serial bus (USB) interface, a secure digital (SD) card interface, or an audio interface.

A connecting terminal 578 may include a connector via, which the electronic device 501 may be physically connected with the external electronic device (e.g., the electronic device 502). According to an embodiment, the connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or electrical stimulus which may be recognized by a user via his tactile sensation or kinesthetic sensation. According to an embodiment, the haptic module 579 may include, for example, a motor, a piezoelectric element, or an electric stimulator.

The camera module 580 may capture a still image or moving images. According to an embodiment, the camera, module 580 may include one or more lenses, image sensors, ISPs, or flashes.

The power management module 588 may manage power supplied to the electronic device 501. According to one embodiment, the power management module 588 may be implemented as at least part of, for example, a power management integrated circuit (PMIC).

The battery 589 may supply power to at least one component of the electronic device 501. According to an embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508), and performing communication via the established communication channel. The communication module 590 may include at least one communication processor that is operable independently from the processor 520 (e.g., the application processor) and supports direct (e.g., wired) communication or wireless communication. According to an embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication module). A corresponding one of these communication modules may communicate with the external electronic device 504 via the first network 598 (e.g., a short-range communication network, such as Bluetooth™, wireless-fidelity (Wi-Fi) direct, or IR data association (IrDA)) or the second network 599 (e.g., a long-range communication network, such as a cellular network, the Internet, or a computer network (e.g., LAN or wide area network (WAN)). These various types of communication modules may be integrated into a single component (e.g., a single chip), or may be implemented as multi components (e.g., multi chips) separate from each other. The wireless communication module 592 may identify and authenticate the electronic device 501 in a communication network, such as the first network 598 or the second network 599, using subscriber information (e.g., international mobile subscriber identity (IMSI)) stored in the SIM 596.

The antenna module 597 may transmit or receive a signal or power to or from the outside (e.g., the external electronic device). According to an embodiment, the antenna module may include one antenna including a radiator which is formed of a conductor or a conductive pattern formed on a substrate (for example, a printed circuit board (PCB)). According to an embodiment, the antenna module 597 may include a plurality of antennas. In this case, at least one antenna appropriate for a communication scheme used in the communication network, such as the first network 598 or the second network 599, may be selected from the plurality of antennas, for example, by the communication module 590. The signal or the power may then be transmitted or received between the communication module 590 and the external electronic device via the selected at least one antenna. According to some embodiments, in addition to the radiator, other components (e.g., an RFIC) may be additionally formed as part of the antenna module 597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 501 and the external electronic device 504 via the server 508 coupled with the second network 599. The external electronic device 502 or 504 may be a device of a same type as, or a different type, from the electronic device 501. All or some of operations to be executed at the electronic device 501 may be executed at at least one of the external electronic devices 502, 504, or 508. For example, if the electronic device 501 should perform a function or a service automatically, or in response to a request from a user or another device, the electronic device 501, instead of, or in addition to, executing the function or the service, may request at least one external electronic device to perform at least part of the function or the service. The at least one external electronic device receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, cloud computing, distributed computing, or client-server computing technology may be used, for example.

Figure 6:
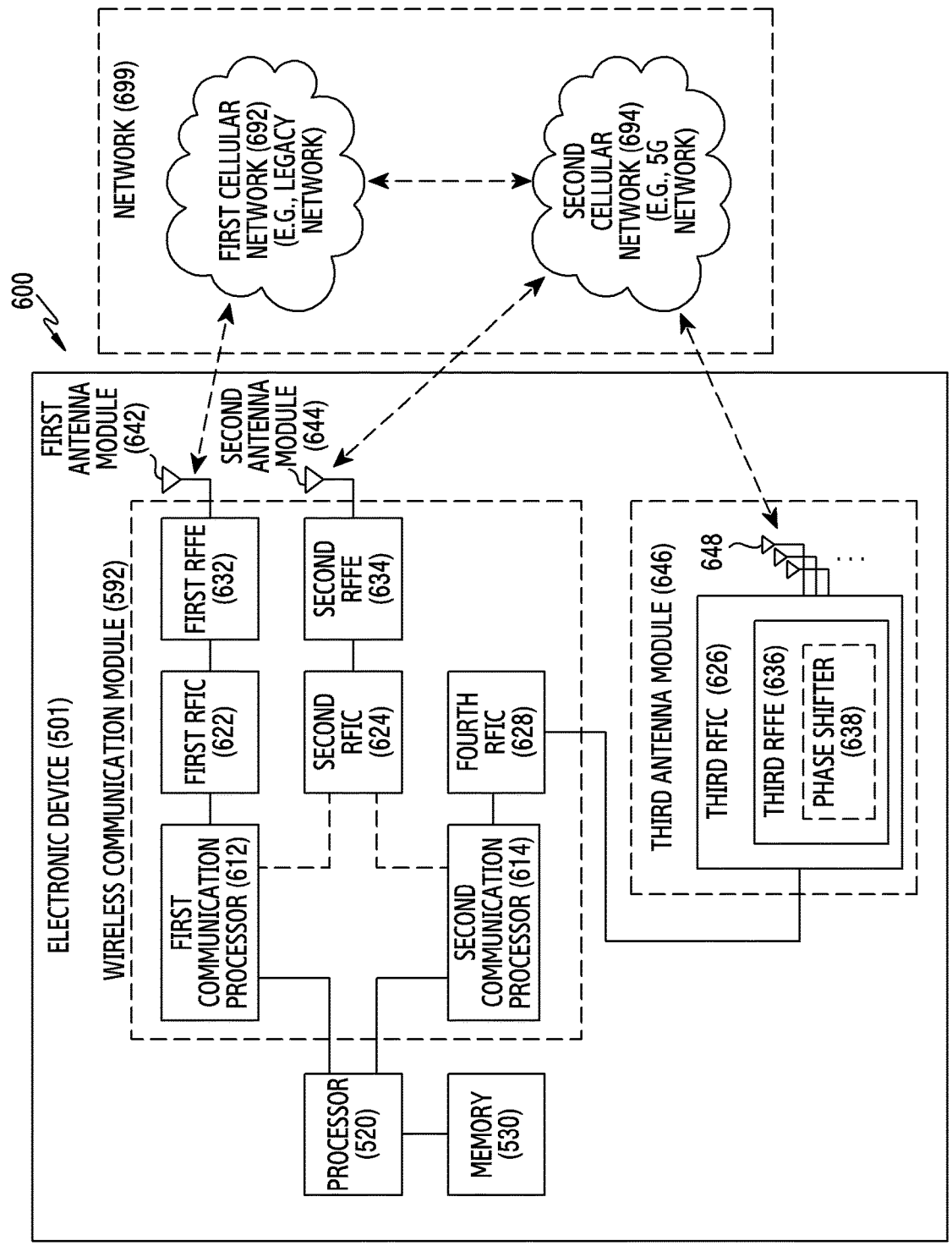
FIG. 6 illustrates a communication module that supports communication with a plurality of wireless networks in an electronic device according to an embodiment.

FIG. 6 illustrates a communication module that supports communication with a plurality of wireless networks in an electronic device according to an embodiment.

Referring to FIG. 6, the electronic device 501 includes a first communication processor 612, a second communication processor 614, a first RFIC 622, a second RFIC 624, a third RFIC 626, a fourth RFIC 628, a first RF front end (RFFE) 632, a second RFFE 634, a first antenna module 642, a second antenna module 644, and antenna elements 648. The electronic device 501 further includes a processor 520 and a memory 530.

A second network 199 includes a first cellular network 692 and a second cellular network 694.

Alternatively, the electronic device 501 may include at least one additional component among the components illustrated in FIG. 1, and the second network 199 may further include at least one other network.

The first communication processor 612, the second communication processor 614, the first RFIC 622, the second RFIC 624, the fourth RFIC 628, the first RFFE 632, and the second RFFE 634 may form at least part of a wireless communication module. Alternatively, the fourth RFIC 628 may be omitted or may be included as part of the third RFIC 626.

The first communication processor 612 may support establishing a communication channel of a band to be used for wireless communication with the first cellular network 692, and support legacy network communication via the established communication channel. The first cellular network 692 may be a legacy network including a second generation (2G), third generation (3G), 4G, or LTE network. The second communication processor 614 may support establishing a communication channel corresponding to a designated band (e.g., about 6 GHz to about 60 GHz) among bands to be used for wireless communication with the second cellular network 694, and support 5G network communication via the established communication channel.

The second cellular network 694 may be a 5G network, which is defined in 3GPP. Additionally, the first communication processor 612 or the second communication processor 614 may support establishing a communication channel corresponding to another designated band (e.g., about 6 GHz or lower) among the bands to be used for wireless communication with the second cellular network 694, and support 5G network communication via the established communication channel. The first communication processor 612 and the second communication processor 614 may be implemented within a single chip or a single package. Alternatively, the first communication processor 612 or the second communication processor 614 may be formed within the single chip or the single package, with the processor 520, an auxiliary processor 123, or a communication module 190. The first communication processor 612 and the second communication processor 614 may be directly or indirectly connected with each other by an interface to provide or receive data or a control signal in one direction or in both directions.

When transmitting signals, the first RFIC 622 may convert a BB signal, which is generated by the first communication processor 612, into an RF signal of about 700 MHz to about 3 GHz to be used in the first cellular network 692 (e.g., a legacy network). When signals are received, an RF signal may be acquired from the first cellular network 692 (e.g., the legacy network) via an antenna (e.g., the first antenna module 642), and may be pre-processed through an RFFE (e.g., the first RFFE 632). The first RFIC 622 may convert the pre-processed RF signal into a BB signal to be processed by the first communication processor 612.

When transmitting signals, the second RFIC 624 may convert a BB signal, which is generated by the first communication processor 612 or the second communication processor 614, into an RF signal (hereinafter, a 5G Sub6 RF signal) of a Sub6 band (e.g., about 6 GHz or lower) to be used in the second cellular network 694 (e.g., a 5G network). When signals are received, a 5G Sub6 RF signal may be acquired from the second cellular network 694 via the second antenna module 644, and may be pre-processed through the second RFFE 634. The second RFIC 624 may convert the pre-processed 5G Sub6 RF signal into a BB signal to be processed by a corresponding communication processor among the first communication processor 612 or the second communication processor 614.

When transmitting signals, the third RFIC 626 may convert a BB signal, which is generated by the second communication processor 614, into an RF signal (hereinafter, a 5G Above6 RF signal) of a 5G Above6 band (e.g., about 6 GHz to about 60 GHz) to be used in the second cellular network 694. When receiving signals, the third RFIC 626 may pre-process a 5G Above6 RF signal acquired from the second cellular network 694 via the antenna elements 648, and may convert the pre-processed 5G Above6 RF signal into a BB signal to be processed by the second communication processor 614. The third RFFE 636 may be formed as part of the third RFIC 626.

The electronic device 501 may include the fourth RFIC 628 separate from or as part of the third RFIC 626. The fourth RFIC 628 may convert a BB signal, which is generated by the second communication processor 614, into an RF signal of an intermediate frequency (IF) band (e.g., about 9 GHz to about 11 GHz) (hereinafter, an IF signal), and then may transfer the IF signal to the third RFIC 626. The third RFIC 626 may convert the IF signal into a 5G Above6 RF signal. When signals are received, a 5G Above6 RF signal may be received from the second cellular network 694 via the antenna elements 648, and may be converted into an IF signal by the third RFIC 626. The fourth RFIC 628 may convert the IF signal into a BB signal to be processed by the second communication processor 614.

The first RFIC 622 and the second RFIC 624 may be implemented as part of a single chip or single package. The first RFFE 632 and the second RFFE 634 may be implemented as part of a single chip or a single package. Alternatively, at least one of the first antenna module 642 or the second antenna, module 644 may be omitted, or may be coupled with another antenna module to process corresponding RF signals of a plurality of frequency bands.

The third RFIC 626 and the antenna elements 648 may be disposed on the same substrate to form a third antenna module 646. For example, the wireless communication module 592 or the processor 520 may be disposed on a first substrate (e.g., a main PCB or a first PCB). The third antenna module 646 may be formed by the third RFIC 626 being disposed on an area (e.g., a lower surface) of a second substrate (e.g., a sub PCB or a second PCB) separate from the first substrate, and the antenna elements 648 being disposed on another area (e.g., an upper surface). The third RFIC 626 and the antenna elements 648 may be disposed on the same substrate, so that a length of a transmission line therebetween can be reduced. This can reduce loss (e.g., attenuation) of a signal of a high frequency band used for 5G network communication, which is caused by the transmission line. Accordingly, the electronic device 501 can enhance quality or speed of communication with the second cellular network 694.

The third RFFE 636 included may be separated from the third RFIC 626 and may be formed as a separate chip. For example, the third antenna module 646 may include the third RFFE 636 and the antenna elements 648 on the second substrate. For example, the third antenna module 646 including the third RFIC 626 from which the third RFFE 636 is separated may be disposed on the second substrate or may not be disposed.

The antenna elements 648 may be formed as an antenna array including a plurality of antenna elements to be used for beamforming. The third RFIC 626 includes a plurality of phase shifters 638 corresponding to the plurality of antenna elements, as part of the third RFFE 636. When transmitting signals, the plurality of phase shifters 638 may shift phases of 5G Above6 RF signals to be transmitted to the outside (e.g., a base station of the 5G network) of the electronic device 501 via corresponding antenna elements. When receiving signals, the plurality of phase shifters 638 may shift phases of 5G Above6 RF signals received from the outside through corresponding antenna elements to the same phases or substantially the same phases, which makes it possible to transmit or receive through beamforming between the electronic device 510 and the outside.

The third antenna module 646 may up-convert a transmission signal of a BB provided by the second communication processor 614. The third antenna module 646 may transmit an RF transmission signal generated by up-conversion via at least two transmission/reception antenna elements among the plurality of antenna elements 648. The third antenna module 646 may receive an RF reception signal via at least two transmission/reception antenna elements and at least two reception antenna elements among the plurality of antenna elements 648. The third antenna module 646 may generate a reception signal of a BB by down-converting the RF reception signal. The third antenna module 646 may output the reception signal of the BB generated by down-conversion to the second communication processor 614. The third antenna module 646 may include at least two transmission reception circuits corresponding to at least two transmission/reception antenna elements one by one, and at least two reception circuits corresponding to at least two reception antenna elements one by one.

The second cellular network 694 may be operated independently from the first cellular network 692 (e.g., standalone (SA)), or may be operated in conjunction therewith (e.g., non-stand alone (NSA)).

The 5G network may include only an access network (e.g., a 5G RAN or a next generation (NG) RAN), and may not include a core network (e.g., an NG core (NGC)). After accessing the access network of the 5G network, the electronic device 501 may access an external network the Internet) under control of the core network of the legacy network (e.g., an evolved packed core (EPC)). Protocol information (e.g., LTE protocol information) for communication with the legacy network or protocol information (e.g., NR protocol information) for communication with the 5G network may be stored in the memory 630, and may be accessed by other components (e.g., the processor 520, the first communication processor 612, or the second communication processor 614).

The processor 520 of the electronic device 501 may execute one or more instructions stored in the memory 530. The processor 520 may include a circuit for processing data, for example, at least one of an integrated circuit (IC), an arithmetic logic unit (ALU), a field programmable gate array (FPGA), and large scale integration (LSI). The memory 530 may store data related to the electronic device 501. The memory 530 may include a volatile memory such as a random access memory (RAM) including a static RAM (SRAM) or a dynamic RAM (DRAM), etc., or may include a nonvolatile memory such as a flash memory, an embedded multimedia card (eMMC), a solid state drive (SSD), as well as a read only memory (ROM), a magneto-resistive RAM (MRAM), a spin-transfer torque MRAM (STT-MRAM), a phase-change RAM (PRAM), a resistive RAM (RRAM), a ferroelectric RAM (FeRAM).

The memory 530 may store an instruction related to an application and an instruction related to an OS. The OS is system software that is executed by the processor 530. The processor 520 may manage hardware components included in the electronic device 501, by executing the OS. The OS may provide an application programming interface (API) to an application, which is the remaining software except for the system software.

One or more applications which are sets of a plurality of instructions may be installed in the memory 530. The application being installed in the memory 530 may indicate that the application is stored in a format to be executable by the processor 520 connected to the memory 530.

An electronic device operating in a 5G communication system may include a plurality of antenna modules that are disposed to be directed in different directions, and implement beams of various directions by adjusting a phase and an amplitude. The plurality of antenna modules may include at least one serving antenna module and at least one non-serving antenna module. The serving antenna module in the electronic device may be connected with a serving cell to form a serving beam for transmitting/receiving data (or signal). The non-serving antenna module in the electronic device may be an antenna module that may be temporarily selected as a serving antenna module. The non-serving antenna module may be adaptively monitored by considering a pre-defined condition (e.g., at least one of a temperature of the serving antenna module, a strength of a received signal, rotation or movement of the electronic device). The serving antenna module and the non-serving antenna module may refer to one or a plurality of antenna modules.

In a wireless communication system, a direction of a signal received from a serving cell or a neighboring cell may be frequently changed due to a channel changing factor such as rotation and movement, a blockage of the electronic device, etc. In this case, the electronic device may need to adaptively monitor the serving antenna module and the non-serving antenna module in order to efficiently receive a signal from the serving cell or the neighboring cell.

The operation of monitoring the antenna module according to a hardware structure of the electronic device may include a method of monitoring antenna modules simultaneously or separately at different times. In the former case, the non-serving antenna module may be monitored without influencing an operation of the serving antenna module which receives data, but since the plurality of antenna modules are monitored simultaneously, power consumption of the electronic device may increase. In the latter case, a signal may not be received for a predetermined time in an operation of switching the antenna module. Accordingly, when the non-serving antenna module is monitored, it may be desirable to monitor the non-serving antenna module only when monitoring is required.

In the following descriptions, an electronic device including a plurality of antenna modules is disclosed. The plurality of antenna modules may include at least one serving antenna module used for communication with a serving cell, and at least one non-serving antenna module that is not used for communication with the serving cell. In the following descriptions, the serving antenna module will be referred to as a first antenna module and the non-serving antenna module will be referred to as a second antenna module for convenience of explanation. The first antenna module and the second antenna module may refer to one or a plurality of antenna modules. The first antenna module and the second antenna module have conceptual meanings, and may not refer to specific antenna modules included in the electronic device, and an antenna module may be classified as the first antenna module or the second antenna module according to whether it is connected with the serving cell and is currently used to receive data. That is, a specific antenna module included in the electronic device does not fixedly operate as the first antenna module and may be classified as the second antenna module in some cases.

The electronic device may perform communication with another electronic device such as a base station via the first antenna module. When the electronic device is to perform communication with another electronic device, such as a base station via the second antenna module, the electronic device may monitor the second antenna module. By monitoring the second antenna module, the electronic device may receive a reference signal (e.g., a synchronization signal/physical broadcasting channel (SS/PBCH) or a channel state information-reference signal (CSI-RS)) via the second antenna module, and may measure RSRP with respect to the received reference signal.

The electronic device may periodically monitor the second antenna module or may monitor the second antenna module when RSRP on the first antenna module is less than or equal to a reference value. A method for the electronic device to determine to monitor the second antenna module may combine the above-defined two methods, may periodically monitor the second antenna module, and simultaneously, may finish monitoring the second antenna module when RSRP of the first antenna module is greater than or equal to the reference value.

Figure 7:
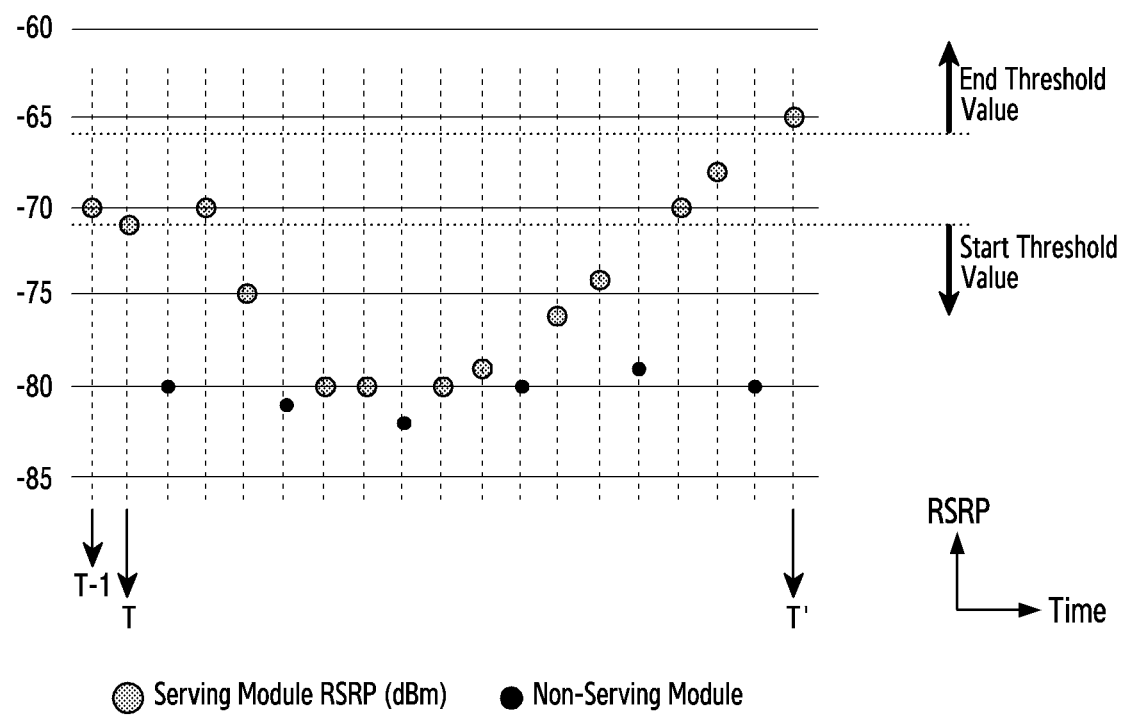
FIG. 7 illustrates an example of monitoring a second antenna module according to RSRP of a first antenna module according to an embodiment.

FIG. 7 illustrates an example of monitoring a second antenna module according to RSRP of a first antenna module in an electronic device according to an embodiment.

Referring to FIG. 7, the electronic device may periodically monitor the second antenna module until RSRP of the first antenna module is greater than or equal to a reference value.

In FIG. 7, the x-axis refers to a time axis and the y-axis refers to an RSRP value measured in the electronic device, A start threshold value may correspond to an RSRP value of the first antenna module to start monitoring the second antenna module, and an end threshold value may correspond to an RSRP value of the first antenna module to finish monitoring the second antenna module. The RSRP refers to reception power of a reference signal received at a terminal, and may use the unit of dBm. The RSRP may be a criterion for measuring signal quality of a current serving cell in order to determine handover or reselection of the cell. The reference signal for measuring the RSRP may be at least one of as SS/PBCH, or a CSI-RS in the 5G communication system.

At a time T−1 at which the RSRP of the first antenna module is greater than or equal to the start threshold value, the second antenna module may not be monitored. After a time T at which the RSRP of the first antenna module decreases to be less than or equal to the start threshold value, monitoring of the second antenna module may be started. After the time T at which the RSRP of the first antenna module decreases to be less than or equal to the start threshold value, the RSRP on the second antenna module may be measured periodically. Monitoring the first antenna module and monitoring the second antenna module may be performed simultaneously, and after a time T' at which the RSRP on the first antenna module is greater than or equal to the end threshold value, monitoring of the second antenna module may be finished.

A method of monitoring the second antenna module may be based only on the RSRP value of the first antenna module, and therefore, may not easily and/or adaptively deal with a channel change caused by various factors occurring in a real wireless communication environment, and power consumption may be caused by unnecessary monitoring of the antenna module.

Figure 8:
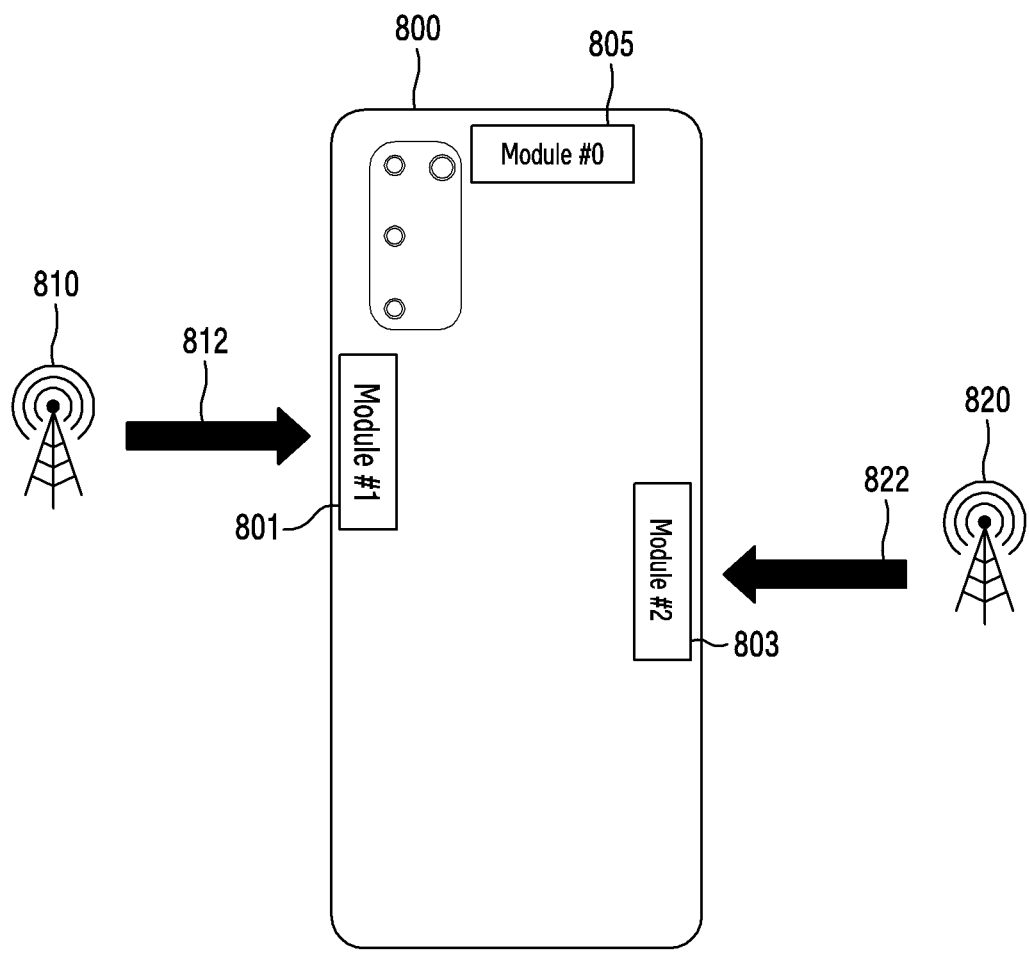
FIG. 8 illustrates a wireless communication environment of an electronic device including a plurality of antenna modules according to an embodiment.

FIG. 8 illustrates a wireless communication environment of an electronic device including a plurality of antenna modules according to an embodiment.

Referring to FIG. 8, the wireless communication environment includes an electronic device 800, a serving cell 810, and a neighboring cell 820. Although the wireless communication environment in FIG. 8 includes only the one serving cell 810, and the one neighboring cell 820, the wireless communication environment may include a plurality of serving cells and/or a plurality of neighboring cells with reference to the electronic device 800. The neighboring cells 820 may be used as candidate cells to be selected as a serving cell through monitoring by the electronic device 800.

The electronic device 800 includes a plurality of antenna modules 801, 803, and 805. The electronic device 800 may communicate with the serving cell 810 and the neighboring cell 820 by using at least one serving antenna module among the plurality of antenna modules 801, 803, and 805, and may monitor a non-serving antenna module corresponding to some or all of the remaining antenna modules when a predetermined condition is satisfied. The serving antenna module may refer to an antenna module that is being used by the electronic device 800 for current communication among the plurality of antenna modules 801, 803, and 805 included in the electronic device 800. For example, the serving antenna module may refer to an antenna module via which the electronic device 800 communicates by forming a current beam. The non-serving antenna module may refer to the remaining antenna module except for the serving antenna module among the plurality of antenna, modules 801, 803, and 805 included in the electronic device 800. The non-serving antenna module may be an antenna module that does not perform an operation for communication with the serving cell 810 among the plurality of antenna modules 801, 803, and 805 included in the electronic device 800. The electronic device 800 may monitor the non-serving antenna module in order to select or change the serving antenna module by considering factors such as wireless communication performance, efficient power consumption, etc. The predetermined condition may be already determined to determine periodic or aperiodic monitoring with respect to the non-serving antenna module. The predetermined condition may be heat emission and/or communication performance (e.g., signal quality or channel quality) of the antenna module.

The first antenna module 801 may be used as a serving antenna module to perform data communication with the serving cell 810 and the neighboring cell 820. The first antenna module 801 may form a serving beam for data communication with the serving cell 810. The serving antenna module may refer to an antenna module that is being used by the electronic device 800 for current communication among the plurality of antenna modules 801, 803, and 805 included in the electronic device 800. For example, the serving antenna module may refer to an antenna module via which the electronic device 800 communicates by forming a current beam. The second antenna module 803 and the third antenna module 805 may refer to non-serving antenna modules corresponding to some or all of the remaining antenna modules except for the first antenna module 801, e.g., the serving antenna module, among the antenna modules 801, 803, and 805 included in the electronic device 800.

Although FIG. 8 illustrates that the electronic device 800 including three antenna modules 801, 803, and 805, there is no limit to the number of antenna modules included in the electronic device 800.

The serving cell 810 may refer to a cell that is connected with the electronic device 800 (e.g., radio resource control (RRC)_connected) and performs communication, and the neighboring cell 820 may refer to a cell that exists on a position adjacent to the electronic device 800. The neighboring cell 820 may be a candidate cell that may be selected as a serving cell through a monitoring operation by the electronic device 800. The serving cell 810 and the neighboring cell 820 may be base stations (e.g., gNBs or eNBs). The serving cell 810 and the neighboring cell 820 may be individual distributed units (DUs) belonging to the same central unit (CU). Alternatively, the serving cell 810 and the neighboring cell 820 may be individual radio units (RUs) belonging to the same DU.

The electronic device 800 may receive a reference signal (e.g., an SS/PBCH or a CSI-RS) from the serving cell 810 and the neighboring cell 820 by using the first antenna module 801. The electronic device 800 may measure channel quality (e.g., RSRP) with the serving cell 810 and the neighboring cell 820, based on a strength of the received reference signal.

The electronic device 800 may select an antenna module (e.g., the first antenna module 801) suitable for communication with the serving cell 810 or the neighboring cell 820, as a serving antenna module, among the plurality of antenna modules 801, 803, and 805. The first antenna module 801 selected as the serving antenna module may be disposed in a direction 812 facing the serving cell 810 in the electronic device 800. Accordingly, an RSRP value on the reference signal that the electronic device 800 receives from the serving cell 810 by using the first antenna module 801 may be relatively higher than an RSRP value on the reference signal received from the neighboring cell 820 because a beam direction formed by the first antenna module 801, which is selected as a serving antenna module, is more favorable for communication with the serving cell 810 than communication with the neighboring cell 820, that is, because the beam direction formed by the first antenna module 801 faces the direction 812 with the serving cell 810, more than a direction 822 with the neighboring cell 820. If the electronic device 800 monitors the second antenna module 803, an RSRP value on the reference signal received from the neighboring cell 820 may be relatively higher than an RSRP value on the reference signal received from the serving cell 810. If the electronic device monitors the second antenna module 803 but the RSRP value on the reference signal received from the serving cell 810 is relatively higher than the RSRP value on the reference signal received from the neighboring cell 820, the electronic device 800 may determine whether to change the serving antenna module from the first antenna module 801 to the second antenna module 803.

When the serving cell is changed due to an external factor (e.g., a traffic increase in the current serving cell 810), the electronic device 800 may change the antenna module to an antenna module in which an RSRP value on a reference signal received from the changed serving cell is measured relatively high as a new serving antenna module.

Figure 9:
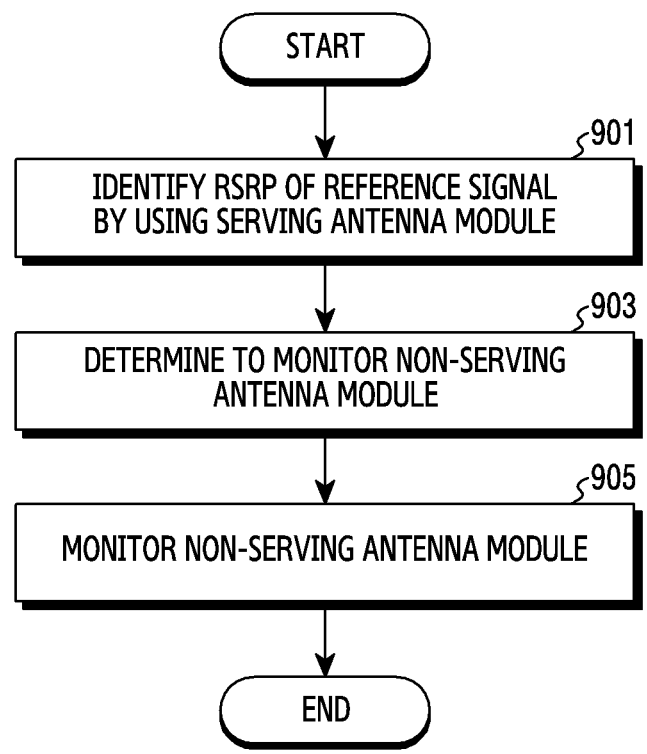
FIG. 9 is a flowchart illustrating a method of monitoring a second antenna module of an electronic device according to an embodiment.

FIG. 9 is a flowchart illustrating a method of monitoring a second antenna module of an electronic device according to an embodiment. Specifically, FIG. 9 illustrates a method for determining to monitor a non-serving antenna module (e.g., the second antenna module 805) in the electronic device 800 of FIG. 8.

As described above, the electronic device 800 of FIG. 8 includes the first antenna module 801, the second antenna module 803, and the third antenna module 805. The first antenna module 801 is a serving antenna module used for communication with the serving cell 810 or the neighboring cell 820, and the second antenna module 803 and the third antenna module 805 of FIG. 8, which are non-serving antenna modules that are not used for communication with the serving cell 810.

The serving antenna module 801 and the non-serving antenna modules 803 and 805 may be changed according to a situation. For example, the first antenna module 801 may not always operate as a serving antenna module and the second antenna module 803 or the third antenna module 805 may operate as a serving antenna module according to performance of the antenna modules 801, 803, and 805 in the electronic device 800.

When it is determined that the first antenna module 801 may not operate as a serving antenna module any longer due to degradation of performance of the first antenna module 801, the first antenna module 801 may be changed to a non-serving antenna module. The performance of the antenna module may be determined through a data transfer rate measured by the electronic device 800 using the antenna module, a channel quality indicator (CQI), CSI fed back to the serving cell 810 or the neighboring cell 820, and RSRP measured through the antenna module.

Referring to FIG. 9, in step 901, the electronic device 800 measures an RSRP value on a reference signal by using the serving antenna module (e.g., the first antenna module 801). The electronic device 800 may set or determine the serving antenna module and the non-serving antenna module before operation 901, although this is not illustrated. The electronic device 800 may set the first antenna module 801 as the serving antenna module for communication with the serving cell 810 or the neighboring cell 820, among the plurality of antenna modules 801, 803, and 805. In this case, the electronic device 800 may set the second antenna module 803 and the third antenna module 805 as non-serving antenna modules.

The electronic device 800 may measure an RSRP value on a reference signal from the serving cell 810 and also from the neighboring cell 820. When quality of the reference signal received from the neighboring cell 820 is better than quality of the reference signal received from the serving cell 810 based on a result of the measurement, the electronic device 800 may perform handover to the neighboring cell 820. In the following description, the RSRP value measured from the serving cell 810 will be referred to as a first RSRP value, and the RSRP value measured from the neighboring cell 820 will be referred to as a second RSRP value for convenience of explanation.

In step 903, the electronic device 800 determines to monitor the non-serving antenna modules 803 and 805, e.g., based on a pre-defined condition being satisfied.

There may be an order for determining pre-defined conditions.

When any one condition among a plurality of pre-defined conditions is satisfied, the electronic device 800 may determine to monitor the second antenna module 803 and/or the third antenna module 805, without determining whether any of the remaining conditions are satisfied. The order for determining may not be fixed and may be changed according to a situation. The pre-defined conditions may be defined based on the RSRP value measured by the serving antenna module in operation 901. The pre-defined conditions may include a case in which an RSRP value of a reference signal from the neighboring cell 820 is greater than or equal to a predetermined level.

The electronic device 800 may measure an RSRP value with respect to a reference signal received from the serving cell 810 and also from the neighboring cell 820. When the electronic device 800 measures RSRP of the serving cell 810 and the neighboring cell 820 by using only the first antenna, module 801, there may be a possibility that the RSRP value on the signal received from the neighboring cell 820 is noticeably lower than a real value. For example, due to a difference in position between the serving cell 810 and the neighboring cell 820, there may be a possibility that an RSRP value of the neighboring cell 820 measured by using only the first antenna module 801 is measured as being noticeably lower than an RSRP value of the neighboring cell 820 measured by using the second antenna module 803 and the third antenna module 805. Accordingly, when a reference signal having an RSRP value greater than or equal to a predetermined level is received from the neighboring cell 820, the electronic device 800 may monitor the second antenna module 803 and/or the third antenna module 805 in order to measure the RSRP value of the reference signal received from the neighboring cell 820. To achieve this, the pre-defined conditions may include a case in which the RSRP value on the reference signal from the serving cell 810, e.g., the first RSRP value, is drastically reduced.

During an operation of a user using the electronic device 800, efficiency of communication via the serving antenna module may be noticeably reduced due to various factors. For example, when the user rotates the electronic device 800 during the operation of using the electronic device 800, it may be more efficient to use the second antenna module 803 than to use the first antenna module 801, due to changes in relative positions between the first antenna module 801, the second antenna module 803, and the third antenna module 805 positioned inside the electronic device 800, and the serving cell 810.

In another example, there may be an obstacle between the electronic device 800 and the serving cell 810, or a blockage may occur in communication of the electronic device 800 with the serving cell 810 according to a shape of user's grip of the electronic device 800. In this case, the RSRP measured at the antenna module 801 of the electronic device 800 with respect to the serving cell 810 may be reduced. Accordingly, it may be more efficient to use the second antenna module 803 as the serving antenna module than to use the first antenna module 801 for the sake of communication with the serving cell 810. Accordingly, when the RSRP measured with respect to the serving cell 810 through the first antenna module 801 is reduced, the electronic device 800 may monitor the second antenna module 803. An operation of monitoring the second antenna module 803 may correspond to operations of receiving a reference signal of the serving cell 810 and/or the neighboring cell 820 through the second antenna module 803 and acquiring RSRP of the received reference signal.

The pre-defined conditions may include a condition regarding whether a sudden movement (e.g., rotation) of the electronic device 800, or a blockage in communication of the electronic device 800 is detected by at least one sensor included in the electronic device 800. To achieve this, the electronic device 800 may include at least one sensor. The at least one sensor may include at least one of a grip sensor, a proximity sensor, a rotation sensor, a movement sensor, an acceleration sensor, etc.

The grip sensor may identify a user's grip detected on the electronic device 800. The grip sensor may be disposed on a position adjacent to the antenna module to identify an antenna module positioned on a portion gripped by the user. The antenna module positioned on the portion gripped by the user may suffer from performance degradation or a blockage of communication in transmitting and receiving signals.

For example, as the user grips a portion where the first antenna module 801 is positioned, RSRP on the reference signal received from the serving cell 810 and the neighboring cell 820 via the first antenna module 801 may be drastically reduced. The grip sensor may identify whether the first antenna module 801 is gripped by the user's hand, and then, based on the identification, may determine whether to monitor the second antenna module 803 and/or the third antenna module 805.

The proximity sensor may identify that an external object is positioned within a designated distance from the electronic device 800. The proximity sensor may be disposed in the same direction as the first antenna module 801, the second antenna module 803, or the third antenna module 805 to identify an external object (e.g., an obstacle or a user's hand) that may influence transmission and reception of a signal via the antenna module. For example, as the external object is positioned adjacent to the electronic device 800, a blockage may occur in communication via the first antenna module 801. In this case, the proximity sensor may identify the presence of the external object that may influence transmission and reception of a signal via, the first antenna module 801, such that the electronic device 800 determines whether to monitor the second antenna module 803 and/or the third antenna module 805.

The electronic device 800 may identify whether an obstacle causing a blockage in communication is removed through a sensor (e.g., the grip sensor or the proximity sensor). For example, the grip sensor and/or the proximity sensor may be disposed adjacent to the antenna module to identify that an obstacle causing a blockage in transmission and reception of a signal via the second antenna module 803 is removed. The electronic device 800 may identify a blockage in communication through the sensor and also the antenna modules included in the electronic device 800.

For example, the grip sensor may identify that the user's grip of the second antenna module 803 is removed. When the user's grip is removed, communication via the second antenna module 803 may be more efficient than communication via the first antenna module 801. Accordingly, when the removal of the user's grip of the second antenna module 803 is detected by the grip sensor, the electronic device 800 may determine to monitor the second antenna module 803, by considering the above-described situation.

As another example, the proximity sensor may identify that an external object existing adjacent to the second antenna module 803 is removed. When the external object is removed, communication via the second antenna module 803 may be more efficient than communication via the first antenna module 801. Accordingly, when the removal of the external object that was causing a blockage in communication via the second antenna module 805 is detected by the proximity sensor, the electronic device 800 may determine to monitor the second antenna module 803 by considering the above-described situation.

The rotation sensor and/or the gyro sensor may identify rotation of the electronic device 800. The electronic device 800 may identify values of a rotation speed and an angular speed of the electronic device 800 by using the rotation sensor and/or the gyro sensor, and may detect rotation of a predetermined level or higher. There may be a pre-defined reference value for detecting rotation of the electronic device 800 by a predetermined level or higher. When the electronic device 800 rotates by the predetermined level or higher, a relative position between the antenna module and the serving cell and/or neighboring cell may be changed. Accordingly, there may be a situation in which it is more efficient to communicate via the second antenna module 803 than to communicate via the first antenna module 801. For example, when a rotation of the electronic device 800 by 180 degrees or more is detected, an RSRP value measured from the reference signal of the serving cell 810, which is measured through the first antenna module 801 of the electronic device 800, may be lower than an RSRP value measured from the reference signal of the serving cell 810 through the second antenna module 803. In this case, the electronic device 800 may determine to monitor the second antenna module 803.

The pre-defined conditions may also include a case in which a predetermined time elapses after the electronic device 800 monitors the non-serving antenna module.

Even when the RSRP value measured through the first antenna module 801 of the electronic device 800 is not changed, there may be a situation in which it is more efficient to measure RSRP through the second antenna module 803 and/or the third antenna module 805 than to measure RSRP through the first antenna module 801, according to a change in an external wireless communication environment of the electronic device 800. As described in the example above, even when degradation of efficiency of the first antenna module 801 is not identified through at least one sensor included in the electronic device 800, there may be a situation in which communication via the second antenna module 803 and/or the third antenna module 805 is more efficient according to a change in the wireless communication environment.

For example, in the direction of the second antenna module 803 of the electronic device 800, an obstacle positioned at such a long distance that it cannot be identified by the proximity sensor may be removed, or a user's grip positioned in such a way that it cannot be identified by the grip sensor may be removed. In these cases, the accuracy of measurement of an RSRP value on the reference signal of the serving cell 810 or the neighboring cell 820 through the second antenna module 803 may be enhanced. For example, there may be a situation in which it is more efficient to measure an RSRP value through the second antenna module 803 than to measure an RSRP value through the first antenna module 801. Accordingly, even when the situations included in the pre-defined conditions do not occur, the electronic device 800 may monitor the non-serving antenna module 803 and/or the third antenna module 805, by considering the possibility that it is more efficient to measure an RSRP value through the second antenna module 803 and/or the third antenna module 805 than to measure an RSRP value through the serving first antenna module 801. When a predetermined time has elapsed thereafter, the electronic device may determine to monitor the non-serving second and third antenna modules 803 and 805.

When the electronic device 800 determines to monitor the non-serving second antenna module 803 or third antenna module 805 in step 903, the electronic device 800 monitors the non-serving second antenna module 803 or third antenna module 805 in step 905. As the non-serving antenna module is monitored, the electronic device 800 may receive a reference signal (e.g., an SS/PBCH or a CSI-RS) from the serving cell 810 and/or the neighboring cell 820 through the non-serving antenna module. Accordingly, the electronic device 800 may measure RSRP on the received reference signal. By monitoring a non-serving antenna module, the electronic device 800 may receive a signal from the serving cell 810 and/or the neighboring cell 820 through all or some beams that can be generated by the non-serving antenna module.

Monitoring the non-serving antenna, module may include monitoring all or some of the non-serving antenna modules included in the electronic device 800.

The electronic device 800 may determine that it is more efficient to measure an RSRP value by using the second antenna module 803 than to measure an RSRP value by using the first antenna module 801 or the third antenna module 805, based on at least one of an RSRP value measured from the antenna, module, occurrence, removal of an external object identified from the sensor included in the electronic device 800, and/or a relative position. In this case, the electronic device 800 may monitor only the second antenna module 803. In this case, the electronic device 800 may receive a signal of the serving cell 810 and/or the neighboring cell 820 through all or some beams that can be generated by the second antenna module 803, and based on this, may measure an RSRP value.

The electronic device 800 may determine to monitor the second antenna module 803 and the non-serving third antenna module 805 simultaneously or in sequence. For example, when the electronic device 800 determines to monitor the second antenna module 803 and the non-serving third antenna module 805 in sequence, the electronic device 800 may determine monitoring priorities of the non-serving antenna modules (e.g., determine to monitor the third antenna module 805 in preference to the second antenna module 803), based on at least one of an RSRP value measured from the antenna module, occurrence, removal of an external object identified from the sensor included in the electronic device 800, and/or a relative position. Accordingly, the electronic device 800 may receive a signal of the serving cell 810 and/or the neighboring cell 820 through all or some beams that can be generated by the third antenna module 805, and then, may receive a signal of the serving cell 810 and/or the neighboring cell 820 through all or some beams that can be generated by the second antenna module 803, and accordingly, may measure an RSRP value.

As another example, when the electronic device 800 determines to monitor the second antenna module 803 and the non-serving third antenna module 805 in sequence, the electronic device 800 may monitor these non-serving antenna modules in sequence, according to pre-defined indexes of the antenna modules. In the above-described embodiments, one beam is generated and is measured at one time, but according to various embodiments, two or more beams may be generated at one time and a signal may be received.

The electronic device 800 may monitor the serving antenna module independently from monitoring the non-serving antenna modules. For example, monitoring of the first antenna module 801 may be performed in the same period as before step 903, and simultaneously, monitoring of the second antenna module 803 and/or the third antenna module 805 may be performed.

As another example, a monitoring period of the first antenna module 801 may be elongated, and the second antenna module 803 and/or the third antenna module 805 may be monitored. As another example, monitoring of the first antenna module 801 may be interrupted, and the second antenna module 803 and/or the third antenna module 805 may be monitored.

As the non-serving antenna module is monitored, the electronic device 800 may switch the current serving antenna module and the current non-serving antenna module. For example, when it is determined that inaccuracy of measurement of an RSRP value through the first antenna module 801 is continuous, it may not be efficient to communicate via the first antenna module 801. In this case, it may be desirable to communicate via the second antenna module 803 and/or the third antenna module 805, rather than via the first antenna module 801, and monitoring of the first antenna module 801 may cause unnecessary power consumption. In this case, the electronic device may switch the first antenna module 801 and the second antenna module 803 and/or the third antenna module 805, and may set the current non-serving antenna module as the serving antenna module and set the current serving antenna module as the non-serving antenna module and may communicate.

The electronic device 800 may monitor the non-serving antenna module, and may change a monitoring period of the non-serving antenna module. For example, the monitoring period of the non-serving antenna module may be reduced.

Figure 10A:
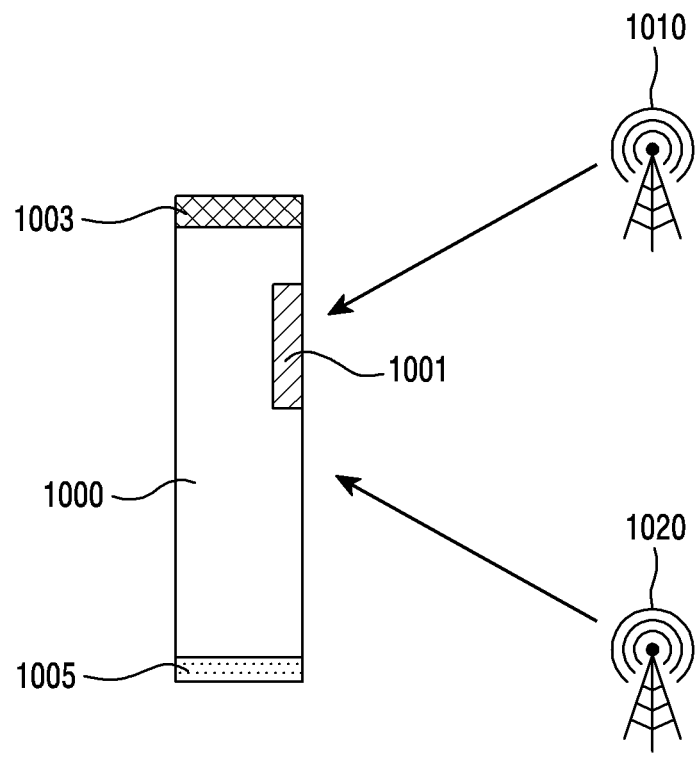
FIG. 10A illustrates a wireless communication environment of an electronic device including a plurality of antenna modules according to an embodiment.

FIG. 10A illustrates a wireless communication environment of an electronic device including a plurality of antenna modules according to an embodiment.

Referring to FIG. 10A, a wireless communication system includes an electronic device 1000, a serving base station 1010, and a neighboring base station 1020. The electronic device 1000 includes a first antenna module 1001, a second antenna module 1003, and a third antenna module 1005. Although FIG. 10A illustrates that the electronic device 1000 including three antenna modules, this is merely one example, and the number of antenna modules included in the electronic device 1000 is not limited thereto.

The electronic device 1000 may receive reference signals from the serving base station 1010 and the neighboring base station 1020. The electronic device 1000 may receive the reference signals from the serving base station 1010 and the neighboring base station 1020 by using the first antenna module 1001, for example. The first antenna module 1001 may be a serving antenna module. The second antenna module 1003 and the third antenna module 1005 may be the remaining antenna modules. The first antenna module 1001 may be referred to as a serving antenna module, and the second antenna module 1003 and the third antenna module 1005 may be referred to as non-serving antenna modules. The serving antenna module and the non-serving antenna module may have conceptual meanings, and may not refer to specific antenna modules included in the electronic device 1000, and an antenna module may be classified as the serving antenna module or the non-serving antenna module according to whether it is connected with the serving base station 1010 and is currently used to receive data. For example, a specific antenna module included in the electronic device 1000 may not fixedly operate as a serving antenna module. For example, the serving antenna module may operate as the non-serving antenna module and the non-serving antenna module may operate as the serving antenna module according to settings of the electronic device 1000.

The serving base station 1010 may refer to a cell that is connected with the electronic device 1000 (e.g., RRC_connected) and communicates. The neighboring base station 1020 may refer to a cell that exists on a position adjacent to the electronic device 1000. The serving base station 1010 and the neighboring base station 1020 may be separate base stations (e.g., gNB and eNB). The serving base station 1010 and the neighboring base station 1020 may be individual DUs belonging to the same CU. The serving base station 1010 and the neighboring base station 1020 may also be individual RUs belonging to the same DU.

The electronic device 1000 may receive reference signals (e.g., an SS/PBCH or a CSI-RS) from the serving base station 1010 and the neighboring base station 1020 by using the first antenna module 1001, and, based on these, may measure RSRP of the reference signals received from the serving base station 1010 and the neighboring base station 1020. The electronic device 1000 may not use the second antenna module 1003 and the third antenna module 1005 in receiving the reference signals from the serving base station 1010 and the neighboring base station 1020.

Due to a difference in relative positions of the electronic device 1000, the serving base station 1010, and the neighboring base station 1020, it may be more efficient for the electronic device 1000 to use the second antenna module 1003 than to use the first antenna module 1001 to communicate with the neighboring base station 1020. When a reception signal of the neighboring base station 1020 corresponding to a signal received from the serving base station 1010 is identified in the first antenna module 1001, the electronic device 1000 may monitor the second antenna module 1003.

Figure 10B:
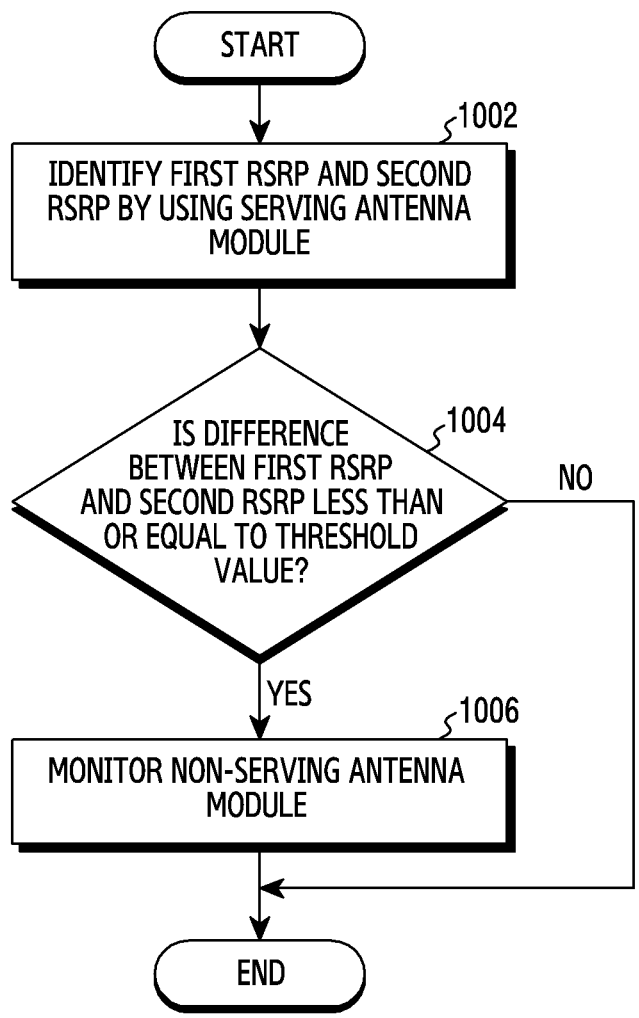
FIG. 10B is a flowchart illustrating a method of monitoring a second antenna module of an electronic device according to an embodiment.

FIG. 10B is a flowchart illustrating a method of monitoring a second antenna module of an electronic device according to an embodiment. More specifically, FIG. 10B illustrates a method for monitoring a non-serving antenna module in the electronic device 1000 according to an embodiment.

Referring to FIG. 10B, in step 1002, the electronic device 1000 measures first RSRP and second RSRP by using a serving antenna module (e.g., the first antenna module 1001). The first RSRP may be an RSRP value that is measured by the electronic device 1000 with respect to a reference signal of the serving base station 1010. The second RSRP may be an RSRP value that is measured by the electronic device 1000 with respect to a reference signal of the neighboring base station 1020.

In step 1004, the electronic device 1000 determines whether a difference value between the first RSRP and the second RSRP identified is less than or equal to a pre-defined threshold value.

For example, the pre-defined threshold value may be 3 (dB), and the first RSRP measured by the electronic device 1000 using the first antenna module 1001 may be −70 (dBM) and the second RSRP may be −72 (dBM). In this case, since the difference value between the first RSRP and the second RSRP, 2, is smaller than the pre-defined threshold value, 3, the electronic device 1000 may determine that a condition for monitoring the second antenna module 1003 and/or the third antenna module 1005 is satisfied. That is, the electronic device 1000 may determine that a signal received from the neighboring base station 1020 is greater than or equal to a predetermined level, and accordingly, may determine to monitor the second antenna module 1003 and/or the third antenna module 1005.

The pre-defined threshold value may be 1 (dB), and the first RSRP measured by the electronic device 1000 using the first antenna module 1001 may be −70 (dBM) and the second RSRP may be −72 (dBM). In this case, since the difference value between the first RSRP and the second RSRP, 2, is greater than the pre-defined threshold value, 1, the electronic device 1000 may determine that the condition for monitoring the second antenna module 1003 and/or the third antenna module 1005 is not satisfied.

When it is determined that the difference value between the first RSRP and the second RSRP is less than or equal to the pre-defined threshold value in step 1004, the electronic device 1000 monitors the non-serving antenna module (e.g., the second antenna module 1003 and/or the third antenna module 1005) in step 1006. After determining to monitor the second antenna module 1003 and/or the third antenna module 1005, the electronic device 100 may monitor the second antenna module 1003 and/or the third antenna module 1005 which are non-serving antenna modules. By monitoring the second antenna module 1003 and/or the third antenna module 1005, the electronic device 1000 may receive a reference signal (e.g., an SS/PBCH or a CSI-RS) through the second antenna module 1003 and/or the third antenna module 1005, and may measure RSRP on the received reference signal.

By monitoring the non-serving antenna module, the electronic device 1000 may receive a signal of the serving cell 1010 and/or the neighboring cell 1020 through all or some beams that can be generated by the non-serving antenna module.

The electronic device 1000 may monitor the non-serving antenna module. For example, the electronic device 1000 may determine that it is more efficient to measure an RSRP value by using the second antenna module 1003 than to measure an RSRP value by using the first antenna module 1001 or the third antenna module 1005, based on at least one of an RSRP value measured from the antenna module, occurrence, removal of an external object identified from a sensor included in the electronic device 1000, and/or a relative position. The electronic device 1000 may monitor only the second antenna module 1003. The electronic device 1000 may receive a signal of the serving cell 1010 and/or the neighboring cell 1020 through all or some beams that can be generated by the second antenna module 1003, and, based on this, may measure an RSRP value.

The electronic device 1000 may determine to monitor the non-serving antenna modules (e.g., the second antenna module 1003 and the third antenna module 1005). The electronic device 1000 may monitor the non-serving antenna modules simultaneously or in sequence. For example, when the electronic device 1000 determines to monitor the non-serving antenna modules in sequence, the electronic device 1000 may determine monitoring priorities of the non-serving antenna modules (e.g., may determine to monitor the third antenna module 1005 before the second antenna module 1003), based on at least one of an RSRP value measured from the antenna module, occurrence, removal of an external object identified from a sensor included in the electronic device 1000, and/or a relative position. Accordingly, the electronic device 1000 may receive a signal of the serving cell 1010 and/or the neighboring cell 1020 through all or some beams that can be generated by the third antenna module 1005, and then, may receive a signal of the serving cell 1010 and/or the neighboring cell 1020 through all or some beams that can be generated by the second antenna module 1003, and accordingly, may measure an RSRP value.

As another example, when the electronic device 1000 determines to monitor the non-serving antenna modules in sequence, the electronic device 1000 may monitor the non-serving antenna modules in sequence according to predefined indexes of the antenna modules.

In the above-described embodiments, one beam is generated and measured at one time, but according to various embodiments, two or more beams may be generated at one time and a signal may be received.

The electronic device 1000 may monitor the first antenna module 1001 independently from monitoring the second antenna module 1003 and/or the third antenna module 1005. For example, the electronic device 1000 may monitor the first antenna module 1001 in the same period as before operation 1003, and simultaneously, may monitor the second antenna module 1003 and/or the third antenna module 1005. As another example, the monitoring period on the first antenna module 1001 may be elongated and the second antenna module 1003 and/or the third antenna module 1005 may be monitored. In another example, monitoring of the first antenna module 1001 may be interrupted, and the second antenna module 1003 and/or the third antenna module 1005 may be monitored.

As the second antenna module 1003 and/or the third antenna module 1005 is monitored, the electronic device 1000 may switch the serving antenna module, which is the first antenna module 1001, to the non-serving antenna module (e.g., the second antenna module 1003 and/or the third antenna module 1005). For example, when it is determined that the above-described situation is continuous in step 1004, it may not be efficient to communicate via the first antenna module 1001 anymore. In this case, it may be desirable to communicate via the second antenna module 1003 and/or the third antenna module 1005, not via the first antenna module 1001, and monitoring of the first antenna module 1001 may cause unnecessary power consumption. In this case, by switching the first antenna module 1001 and the second antenna module 1003 and/or the third antenna module 1005, the electronic device 1000 may set the second antenna module 1003 and/or the third antenna module 1005 as the serving antenna module, and may set the first antenna module 1001 as the non-serving antenna module, and may communicate.

As the electronic device 1000 monitors the second antenna module 1003 and/or the third antenna module 1005, the electronic device 1000 may change the monitoring period of the second antenna module 1003 and/or the third antenna module 1005. For example, the monitoring period of the second antenna module 1003 and/or the third antenna module 1005 may be reduced.

As the electronic device 1000 monitors the second antenna module 1003 and/or the third antenna module 1005, the electronic device 1000 may perform a handover from the serving cell 1010 to the neighboring cell 1020. Based on the first RSRP value and a result of monitoring the non-serving antenna module, the electronic device 1000 may perform handover from the serving base station 1010 to the neighboring cell 1020.

When it is identified that the difference value between the first RSRP and the second RSRP is greater than the predefined threshold value in step 1004, the electronic device 1000 finish the operation for monitoring the second antenna module 1003 and/or the third antenna module 1005, i.e., the method ends.

Figure 11A:
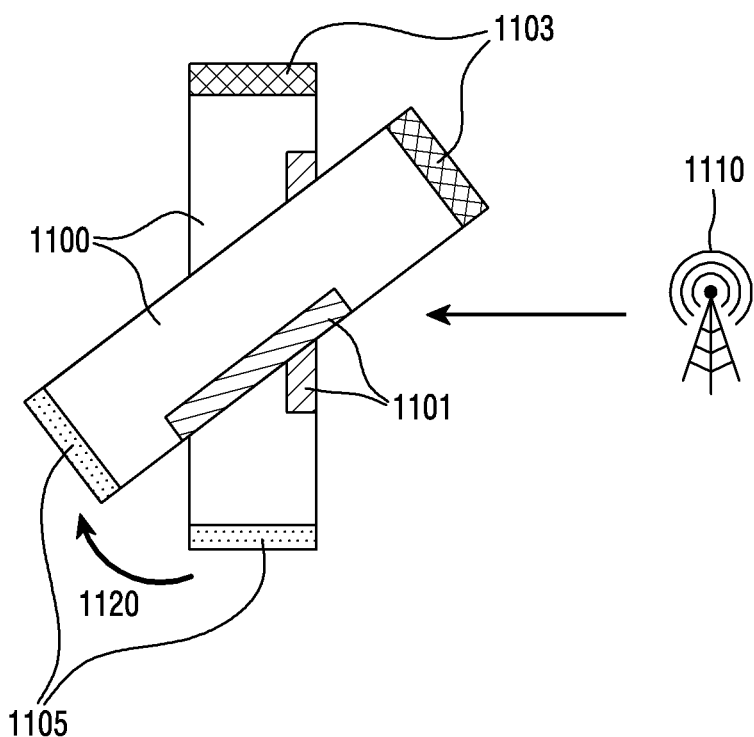
FIG. 11A illustrates a wireless communication environment of an electronic device including a plurality of antenna modules according to an embodiment.

FIG. 11A illustrates a wireless communication environment of an electronic device including a plurality of antenna modules according to an embodiment. More specifically, FIG. 11A illustrates another example of monitoring a non-serving antenna module in an electronic device 1100 according to an embodiment.

Referring to FIG. 11A, a wireless communication system includes an electronic device 1100 and a serving base station 1110. The electronic device 1100 includes a first antenna module 1101, a second antenna module 1103, and a third antenna module 1105. Although FIG. 11A illustrates that the electronic device 1100 includes three antenna modules, this is merely an example, and the number of antenna modules included in the electronic device 1100 is not limited thereto.

The electronic device 1100 may receive a reference signal from the serving base station 1110 by using the first antenna module 1101. The first antenna module 1101 may be a serving antenna module. The second antenna module 1103 and the third antenna module 1105 may be the remaining antenna modules. The second antenna module 1103 and the third antenna module 1105 may be referred to as non-serving antenna modules.

The electronic device 1100 may receive a reference signal (e.g., an SS/PBCH or a CSI-RS) from the serving base station 1110 by using the first antenna module 1101, and based on this, may measure RSRP of the serving base station 1110. In receiving the reference signal from the serving base station 1110, the electronic device 1100 may not use the second antenna module 1103 or the third antenna module 1105.

During an operation of a user using the electronic device 1100, efficiency of communication via the currently used antenna module may be noticeably reduced due to various factors. For example, when the user rotates the electronic device 1100 while using the electronic device 1100, it may be more efficient to communicate with the serving base station 1110 by using the non-serving antenna module than to communicate via the serving antenna module, which is being used for communication with the serving base station, due to a change in relative positions of the antenna modules positioned inside the electronic device 1100, and the serving base station 1110.

As another example, there may be an obstacle between the electronic device 1100 and the serving base station 1110, or a blockage may occur in communication of the electronic device 1100 with the serving base station 1110 according to a shape of user's grip of the electronic device 1100. Due to the above-described example, RSRP of the serving antenna module of the electronic device 1100 may be drastically reduced, and it may be more efficient to communicate by using the non-serving antenna module than to communication via the serving antenna module. Accordingly, when an RSRP value measured through the serving antenna module is drastically reduced, the electronic device 1100 may need to monitor the non-serving antenna module.

Figure 11B:
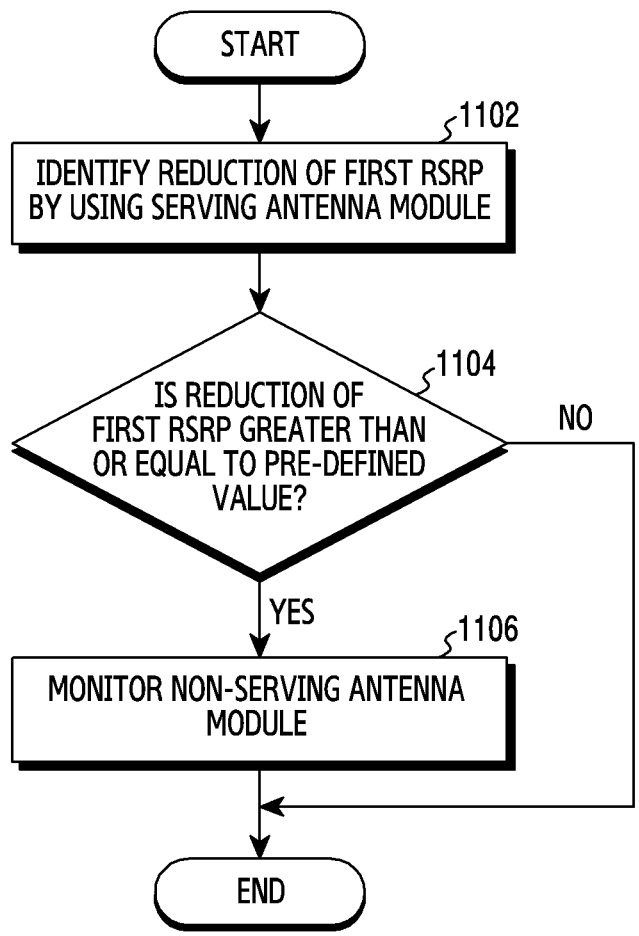
FIG. 11B is a flowchart illustrating a method of monitoring a second antenna module of an electronic device according to an embodiment.

FIG. 11B is a flowchart illustrating a method of monitoring a second antenna module of an electronic device according to an embodiment. Specifically, FIG. 11B illustrates a method for monitoring a non-serving antenna module in the electronic device 1100 according to an embodiment.

Referring to FIG. 11, in step 1102, the electronic device 1100 identifies reduction of first RSRP by using a serving antenna module (e.g., the first antenna module 1101). The first RSRP may be an RSRP value of a reference signal received from the serving base station 1110, which is measured by the electronic device 1100.

In step 1104, the electronic device 1100 determines whether reduction of the RSRP value on the reference signal from the serving base station 1110, e.g., reduction of the first RSRP, is greater than or equal to a pre-defined value. To determine whether the reduction of the first RSRP is greater than or equal to the pre-defined value, a pre-defined threshold value (th_RSRP_DROP) may be used.

In step 1104, the electronic device 1100 determines whether a difference between the currently measured RSRP value and a reference RSRP value is greater than or equal to the pre-defined threshold value (th_RSRP_DROP). The reference RSRP value is a reference value for determining whether the first RSRP value is drastically reduced, and may refer to an RSRP value that is selected within a section defined as a specific time from the present or the number of times. The reference RSRP value may be a value that is set in the electronic device or a value that is calculated by accumulating RSRP values of reference signals measured from the serving cell for a predetermined period, before the first RSRP value is identified. The reference RSRP value may include a maximum value within the section or an average of RSRP values measured in the section. The reference RSRP value may not be a fixed value, and may change with time. The reference RSRP value may be set in a different way according to settings of the electronic device 1100.

The pre-defined threshold value (th_RSRP_DROP) may be 10 (dB), and the reference RSRP value of the electronic device 1100 may be −70 (dBM) and the currently measured RSRP value may be −82 (dBM). In this case, since the difference between the reference RSRP value and the current RSRP value, 12, is greater than the pre-defined threshold value (th_RSRP_DROP) 10, the electronic device 1100 may determine that a condition is satisfied. For example, the electronic device 1100 may determine that the RSRP value of the reference signal received from the serving base station 1110 is drastically reduced, and accordingly, may determine to monitor the second antenna module 1103 and/or the third antenna module 1105 for efficient communication.

As another example, the pre-defined threshold value (th_RSRP_DROP) may be 14 (dB), and the reference RSRP value of the electronic device 1100 may be −70 (dBM) and the currently measured RSRP value may be −82 (dBM). In this case, since the difference between the reference RSRP value and the current RSRP value, 12, is smaller than the pre-defined threshold value (th_RSRP_DROP), 14, the electronic device 1100 may determine that the condition is not satisfied.

When it is determined that the reduction of the first RSRP is greater than or equal to the pre-defined value in step 1104, the electronic device 1100 monitors the second antenna module 1103 and/or the third antenna module 1105 in step 1106. The electronic device 1100 may monitor the second antenna module 1103 and/or the third antenna module 1105, which are non-serving antenna modules. As the second antenna module 1103 and/or the third antenna modules 1105 are monitored, the electronic device 1100 may receive a reference signal (e.g., an SS/PBCH or a CSI-RS) through the second antenna module 1103 and/or the third antenna module 1105, and may measure RSRP with respect to the received reference signal.

As the non-serving antenna module is monitored, the electronic device 1100 may receive a signal of the serving cell 1010 through all or some beams that can be generated by the non-serving antenna module.

Monitoring the non-serving antenna module may include monitoring all or some of the non-serving antenna modules included in the electronic device 1100.

The electronic device 1100 may monitor some of the non-serving antenna modules. For example, the electronic device 1100 may determine that it is more efficient to measure an RSRP value by using the second antenna module 1103 than to measure an RSRP value by using the first antenna module 1101 or the third antenna module 1105, based on at least one of an RSRP value measured from the antenna module, occurrence, removal of an external object identified from a sensor included in the electronic device 1100, and/or a relative position. In this case, the electronic device 1100 may monitor only some of the non-serving antenna modules (e.g., the second antenna module 1103). The electronic device 1100 may receive a signal of the serving cell 1010 through all or some beams that can be generated by the second antenna module 1103, and, based on this, may measure an RSRP value.

The electronic device 1100 may determine to monitor all of the non-serving antenna modules (e.g., the second antenna module 1103 and the third antenna module 1105). The electronic device 1100 may monitor the non-serving antenna modules simultaneously or in sequence. For example, when the electronic device 1100 determines to monitor the non-serving antenna modules in sequence, the electronic device 1100 may determine monitoring priorities of the non-serving antenna modules (e.g., may determine to monitor the second antenna module 1103 before the third antenna module 1105), based on at least one of an RSRP value measured from the antenna module, occurrence, removal of an external object identified from a sensor included in the electronic device 1100, and/or a relative position. Accordingly the electronic device 1100 may receive a signal of the serving cell 1110 through all or some beams that can be generated by the second antenna module 1103, and then, may receive a signal of the serving cell 1110 through all or some beams that can be generated by the third antenna module 1103, and accordingly, may measure an RSRP value.

As another example, when the electronic device 1100 determines to monitor the non-serving antenna modules in sequence, the electronic device 1100 may monitor the non-serving antenna modules in sequence according to pre-defined indexes of the antenna modules. In the above-described embodiments, one beam is generated and measured at one time, but according to various embodiments, two or more beams may be generated at one time and a signal may be received.

The electronic device 1100 may monitor the first antenna module 1101 independently from monitoring the second antenna module 1103 and/or the third antenna module 1105. For example, the electronic device 1100 may monitor the first antenna module 1101 in the same period as before operation 1103, and simultaneously, may monitor the second antenna module 1103 and/or the third antenna module 1105. As another example, the monitoring period on the first antenna module 1101 may be elongated and the second antenna module 1103 and/or the third antenna module 1105 may be monitored. In another example, monitoring of the first antenna module 1101 may be interrupted, and the second antenna module 1103 and/or the third antenna module 1105 may be monitored.

As the second antenna module 1103 and/or the third antenna module 1105 are monitored, the electronic device 1100 may switch the serving antenna module and the non-serving antenna module. For example, when it is determined that the above-described situation is continuous in step 1104, it may not be efficient to communicate via the first antenna module 1101 anymore. In this case, it may be desirable to communicate via the second antenna module 1103 and/or the third antenna module 1105, not via the first antenna module 1101, and monitoring of the first antenna module 1101 may cause unnecessary power consumption. By switching the first antenna module 1101 and the second antenna module 1103 and/or the third antenna module 1105, the electronic device 1100 may set the non-serving antenna, module as the serving antenna module, and may set the serving antenna module as the non-serving antenna module, and may communicate.

As the electronic device 1100 monitors the second antenna module 1103 and/or the third antenna module 1105, the electronic device 1100 may change the monitoring period of the second antenna module 1103 and/or the third antenna module 1105. For example, the monitoring period of the second antenna module 1103 and/or the third antenna module 1105 may be reduced.

When it is identified that the difference value between the first RSRP and the second RSRP is less than the predefined threshold value in step 1104, the electronic device 1100 may finish the operation for monitoring the second antenna module 1103 and/or the third antenna module 1105, the method ends.

Figure 12A:
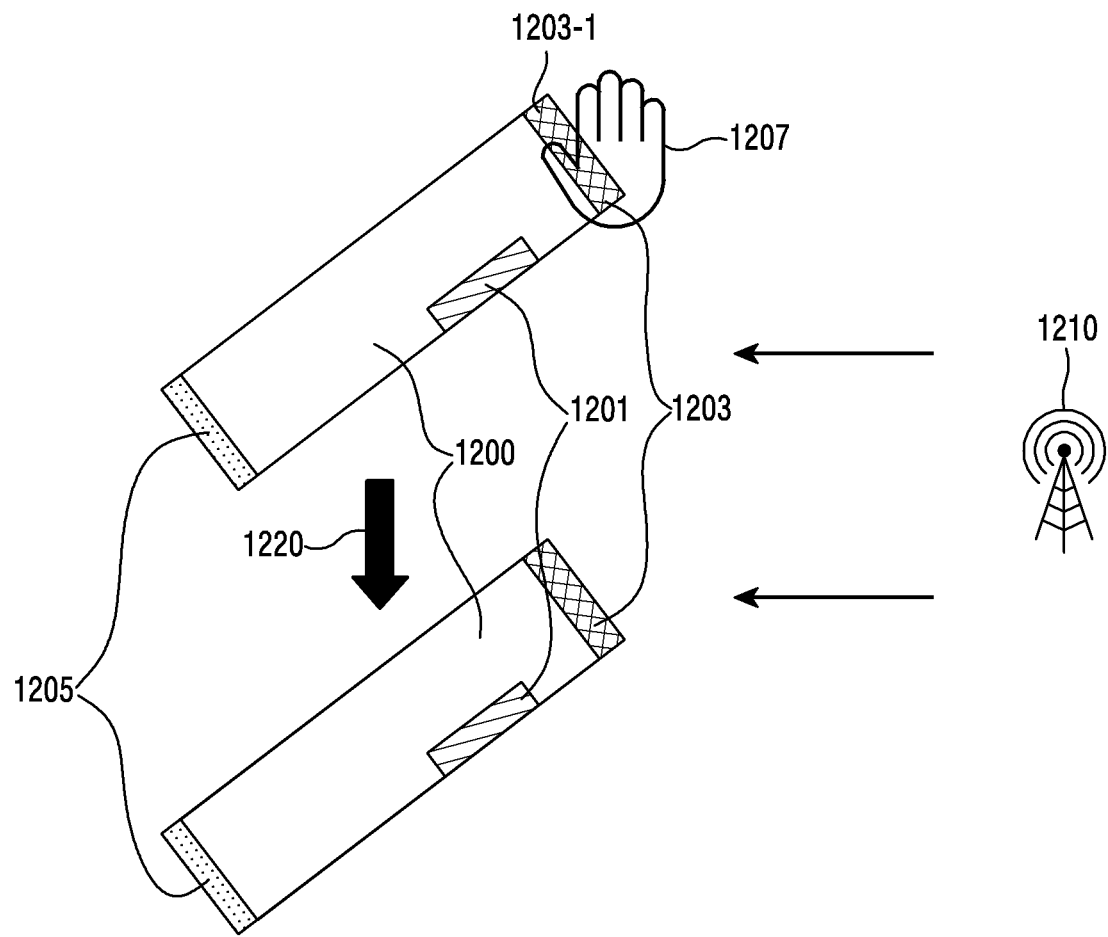
FIG. 12A illustrates a wireless communication environment of an electronic device including a plurality of antenna modules according to an embodiment.

FIG. 12A illustrates a wireless communication environment of an electronic device including a plurality of antenna modules according to an embodiment. Specifically, FIG. 12A illustrates another example of monitoring a non-serving antenna module in an electronic device 1200 according to an embodiment.

Referring to FIG. 12A, a wireless communication system includes an electronic device 1200 and a serving base station 1210. The electronic device 1200 includes a first antenna module 1201, a second antenna module 1203, and a third antenna module 805. Although FIG. 12A illustrates that the electronic device 1200 includes three antenna modules, this is merely an example, and the number of antenna modules included in the electronic device 1200 is not limited thereto.

The electronic device 1200 may receive reference signals from the serving base station 1210 by using the first antenna module 1201. The first antenna module 1201 may be a serving antenna module. The second antenna module 1203 and the third antenna module 1205 may be the remaining antenna modules. The second antenna module 1203 and the third antenna module 1205 may be non-serving antenna modules.

The electronic device 1200 may receive a reference signal (e.g., an SS/PBCH or a CSI-RS) from the serving base station 1210 by using the first antenna module 1201, and, based on this, may measure RSRP of the serving base station 1210. The electronic device 1200 may not use the second antenna module 1203 and the third antenna module 1205 in receiving the reference signals from the serving base station 1210.

The electronic device 1200 may identify an external object 1207 (e.g., a user's grip or an obstacle) positioned adjacent to the second antenna module 1203 by using at least one sensor. The at least one sensor may be a grip sensor, a proximity sensor, a rotation sensor, a movement sensor, an acceleration sensor, and/or other sensors. The electronic device 1200 may identify a blockage in communication through the antenna modules 1201, 1203, and 1205 included in the electronic device 1200, as well as through the sensor. The electronic device 1200 may identify the blockage in communication by identifying a reflection signal strength of a signal transmitted by the electronic device 1200 to the serving cell 1210.

The electronic device 1200 may identify removal 1220 of the user's grip 1207 on the position adjacent to the second antenna module 1203, by using the grip sensor. When the user's grip 1207 on the position adjacent to the second antenna module 1203 is removed, the blockage in communication via the second antenna module 1203 may be removed, and accordingly, communication via the second antenna module 1203 may be more efficient than communication via the first antenna module 1201. The electronic device 1200 may then monitor the second antenna module 1203 and/or the third antenna module 1205.

In another example, the electronic device 1200 may identify that user's grip occurs on a position adjacent to the first antenna module 1201 through the grip sensor. As the user's grip occurs on the position adjacent to the first antenna module 1201, a blockage in communication via the first antenna module 1201 may occur. As the blockage occurs in communication via the first antenna module 1201, communication via the second antenna module 1203 and/or the third antenna module 1205 may be more efficient. In this case, the electronic device 1200 may monitor the second antenna module 1203 and/or the third antenna module 1205.

Figure 12B:
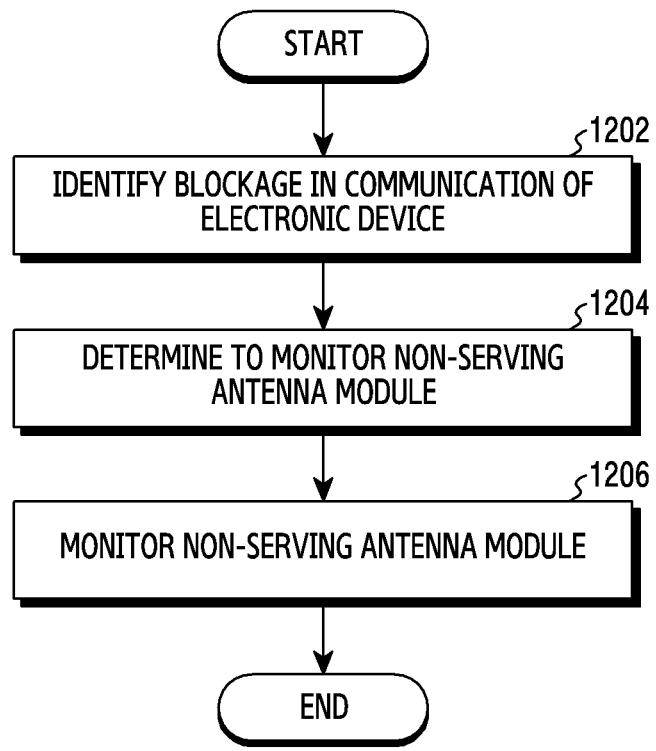
FIG. 12B is a flowchart illustrating a method of monitoring a second antenna module of an electronic device according to an embodiment.

FIG. 12B is a flowchart illustrating a method of monitoring a second antenna module of an electronic device according to an embodiment. Specifically FIG. 12B illustrates a method for monitoring a non-serving antenna module in the electronic device 1200 according to an embodiment.

Referring to FIG. 12B, in step 1202, the electronic device 1200 identifies a blockage in communication by using at least one sensor. Identifying the blockage in the communication may include identifying occurrence and removal of the blockage in the communication. The at least one sensor may be a grip sensor, a proximity sensor, a rotation sensor, a movement sensor, an acceleration sensor, or other sensors. For example, the electronic device 1200 may identify that an external object positioned adjacent to the non-serving antenna module is removed through the grip sensor or the proximity sensor. Accordingly the electronic device 1200 may identify that the blockage in the communication via the non-serving antenna module is removed. In another example, the electronic device 1200 may identify that an external object is positioned on a position adjacent to the serving antenna module through the grip sensor or the proximity sensor. Accordingly, the electronic device 1200 may identify occurrence of a blockage in communication via the serving antenna module.

In step 1204, the electronic device 1200 determines to monitor the second antenna module 1203 and/or the third antenna module 1205, e.g., based on the occurrence or removal of the blockage in the communication identified. The operation of determining to monitor has been fully described above, and accordingly, a detailed description is omitted here.

In step 1206, the electronic device 1200 may monitor the second antenna module 1203 and/or the third antenna module 1205. After determining to monitor the second antenna module 1203 and/or the third antenna module 1205, the electronic device 1200 may monitor the second antenna module 1203 and/or the third antenna module 1205, which is the non-serving antenna module. As the second antenna module 1203 and/or the third antenna module 1205 is monitored, the electronic device 1200 may receive a reference signal (e.g., an SS/PBCH or a CSI-RS) through the second antenna module 1203 and/or the third antenna module 1205, and may measure RSRP with respect to the received reference signal. Monitoring the second antenna module 1203 and/or the third antenna module 1205 by the electronic device 1200 may correspond to the operation of monitoring the non-serving antenna module of the electronic device 800, the electronic device 1000, or the electronic device 1100 as described above.

The electronic device 11200 may monitor the first antenna module 1201 independently from monitoring the second antenna module 1203 and/or the third antenna module 1205. For example, the electronic device 1200 may monitor the first antenna module 1201 in the same period as before operation 1203, and simultaneously, may monitor the second antenna module 1203 and/or the third antenna module 1205. In another example, the monitoring period on the first antenna module 1201 may be elongated and the second antenna module 1203 and/or the third antenna module 1205 may be monitored. In another example, monitoring of the first antenna module 1201 may be interrupted, and the second antenna module 1203 and/or the third antenna module 1205 may be monitored.

As the second antenna module 1203 and/or the third antenna module 1205 is monitored, the electronic device 1200 may switch the first antenna module 1201 and the second antenna module 1203 and/or the third antenna module 1205, which is the non-serving antenna module. For example, when it is determined that the above-described situation is continuous in step 1204, it may not be efficient to communicate via the first antenna module 1201 anymore. In this case, it may be desirable to communicate via the second antenna module 1203 and/or the third antenna module 1205, not via the first antenna module 1201, and monitoring of the first antenna module 1201 may cause unnecessary power consumption. In this case, by switching the first antenna module 1201 and the second antenna module 1203 and/or the third antenna module 1205, the electronic device 1200 may set the second antenna module 1203 and/or the third antenna module 1205 as the serving antenna module, and may set the first antenna module 1201 as the non-serving antenna module, and may communicate.

As the electronic device 11200 monitors the second antenna module 1203 and/or the third antenna module 1205, the electronic device 1200 may change the monitoring period of the second antenna module 1203 and/or the third antenna module 1205. For example, the monitoring period of the second antenna module 1203 and/or the third antenna module 1205 may be reduced.

Figure 13A:
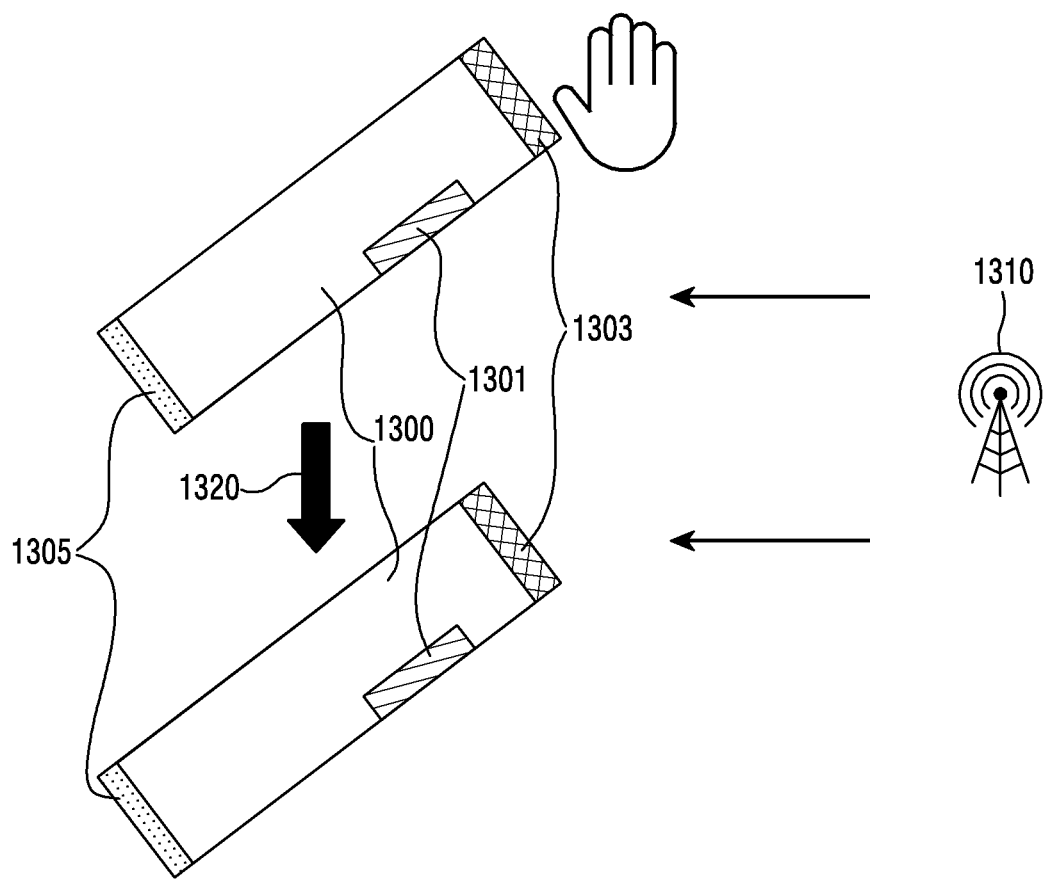
FIG. 13A illustrates a wireless communication environment of an electronic device including a plurality of antenna modules according to an embodiment.

FIG. 13A illustrates a wireless communication environment of an electronic device including a plurality of antenna modules according to an embodiment. Specifically, FIG. 13A illustrates another example of monitoring a non-serving antenna module in an electronic device 1300 according to an embodiment.

Referring to FIG. 13A, a wireless communication system includes an electronic device 1300 and a serving base station 1310. The electronic device 1300 includes a first antenna module 1301, a second antenna module 1303, and a third antenna module 1305. Although FIG. 13A illustrates that the electronic device 1200 includes three antenna modules, this is merely one example, and the number of antenna modules included in the electronic device is not limited thereto.

The electronic device 1300 may receive reference signals from the serving base station 1310. The electronic device 1300 may receive the reference signals from the serving base station 1310 by using the first antenna module 1301. The first antenna module 1301 may be a serving antenna module. The second antenna module 1303 and the third antenna module 1305 may be the remaining antenna modules. The second antenna module 1303 and the third antenna module 1305 may be non-serving antenna modules.

The electronic device 1300 may receive a reference signal (e.g., an SS/PBCH or a CSI-RS) from the serving base station 1310 by using the first antenna module 1301, and, based on this, may measure RSRP of the serving base station 1310. The electronic device 1300 may not use the second antenna module 1303 and the third antenna module 1305 in receiving the reference signals from the serving base station 1310.

FIG. 13A illustrates an example of monitoring the non-serving antenna module (e.g., the second antenna module 1303 or the third antenna module 1305) after a predetermined time is elapsed in the electronic device 1300 according to an embodiment. When a predetermined time has elapsed after the electronic device 1300 monitors the non-serving antenna module, the electronic device may monitor the non-serving antenna module although the situations described above with reference to FIGS. 10A and 10B, FIGS. 11A and 11B, and FIGS. 12A and 12B do not occur.

Even when an RSRP value measured through the first antenna module 1301 of the electronic device 1300 is not changed, it may be more efficient to measure an RSRP value through the second antenna module 1301 and/or the third antenna module 1305 than to measure an RSRP through the first antenna module 1301, according to a change in an external wireless communication environment of the electronic device 1300. Alternatively, even when degradation of efficiency of the first antenna module 1301 is not identified through at least one sensor included in the electronic device 1300, communication via the second antenna module 1303 and/or the third antenna module 1305 may be efficient according to a change in the wireless communication environment.

For example, there may be a case 1320 in which an obstacle that is positioned at such a long distance that it cannot be identified by the proximity sensor of the electronic device 1300 is removed, or a user's grip on a position that cannot be identified by the grip sensor of the electronic device 1300 is removed, after occurring in the direction of the second antenna module 1303 and/or the third antenna module 1305 of the electronic device 1300. In this case, the accuracy of the measurement of an RSRP value on a reference signal of the serving cell 1310 through the second antenna module 1303 and/or the third antenna module 1305 can be enhanced. Accordingly, in this case, it may be more efficient to measure an RSRP value through the second antenna module 1303 and/or the third antenna module 1305 than to measure an RSRP value through the first antenna module 1301. Accordingly, the electronic device 1300 may determine to monitor the second antenna module 1303 and/or the third antenna module 1305 when a predetermined time is elapsed after monitoring the second antenna module 1303 and/or the third antenna module 1305, by considering the possibility that it is more efficient to measure an RSRP value through the second antenna module 1303 and/or the third antenna module 1305 than to measure an RSRP value through the first antenna module 1301.

Figure 13B:
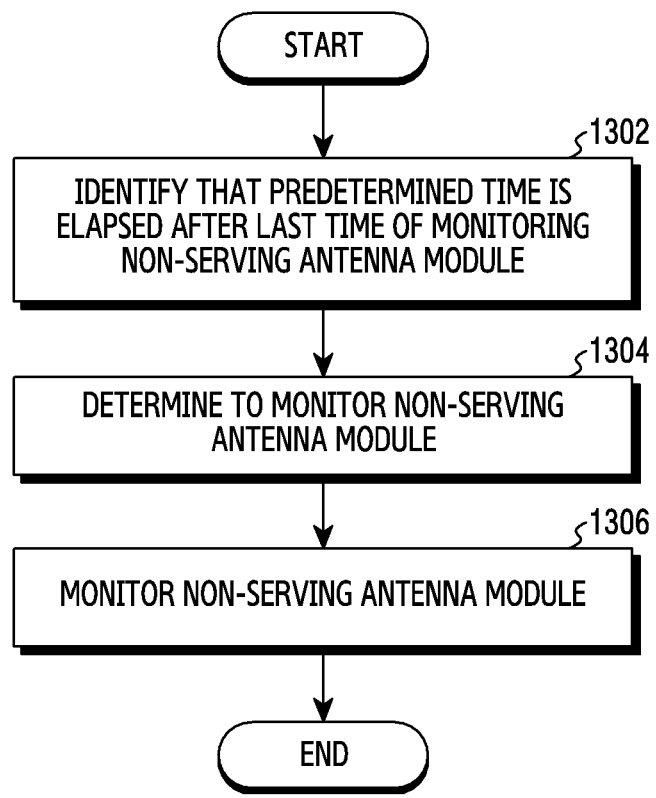
FIG. 13B is a flowchart illustrating a method of monitoring a second antenna module of an electronic device according to an embodiment.

FIG. 13B is a flowchart illustrating a method of monitoring a second antenna module of an electronic device according to an embodiment. Specifically, FIG. 13B illustrates a method of monitoring the non-serving antenna module in the electronic device 1300 according to an embodiment.

Referring to FIG. 13B, in step 1302, the electronic device 1300 identifies that a predetermined time is elapsed after a last time of monitoring the non-serving antenna module (e.g., the second antenna module 1303 and/or the third antenna module 1305). The predetermined time may be a value (th_TIME) that is pre-defined by the electronic device 1300.

In step 1304, the electronic device 1300 determines to monitor the non-serving antenna module. The electronic device 1300 may determine to monitor the second antenna module 1303 and/or the third antenna module 1305 when the predetermined time has elapsed after monitoring the second antenna module 1303 and/or the third antenna module 1305 lastly in step 1302, by considering the possibility that it is more efficient to measure an RSRP value through the second antenna module 1303 and/or the third antenna module 1305 than to measure an RSRP value through the first antenna module 1301, although there is neither a situation in which a signal of a predetermined level or higher is received from a neighboring base station, a situation in which an RSRP value on a reference signal from the serving base station is drastically reduced, nor a situation where occurrence or removal of a blockage in communication is identified from at least one sensor included in the electronic device 1300.

In step 1306, the electronic device 1300 monitors the second antenna module 1303 and/or the third antenna module 1305. After determining to monitor the second antenna module 1303 and/or the third antenna module 1305, the electronic device 1300 may monitor the second antenna module 1303 and/or the third antenna module 1305, which is the non-serving antenna module. As the second antenna module 1303 and/or the third antenna module 1305 is monitored, the electronic device 1300 may receive a reference signal (e.g., an SS/PBCH or a CSI-RS) through the second antenna module 1303 and/or the third antenna module 1305, and may measure RSRP with respect to the received reference signal. Monitoring the second antenna module 1203 and/or the third antenna module 1305 by the electronic device 1300 may correspond to the monitoring operations of the non-serving antenna module by the electronic device 800, the electronic device 1000, and the electronic device 1100 as described above.

The electronic device 1300 may monitor the first antenna module 1301 independently from monitoring the second antenna module 1303 and/or the third antenna module 1305. For example, the electronic device 1300 may monitor the first antenna module 1301 in the same period as before operation 1303, and simultaneously, may monitor the second antenna module 1303 and/or the third antenna module 1305. In another example, the monitoring period on the first antenna module 1301 may be elongated and the second antenna module 1303 and/or the third antenna module 1305 may be monitored. In another example, monitoring of the first antenna module 1301 may be interrupted, and the second antenna module 1303 and/or the third antenna module 1305 may be monitored.

As the second antenna module 1303 and/or the third antenna module 1305 is monitored, the electronic device 1300 may switch the first antenna module 1301 and the second antenna module 1303 and/or the third antenna module 1305 which is the non-serving antenna module. For example, when it is determined that the above-described situation is continuous in step 1304, it may not be efficient to communicate via the first antenna module 1301 anymore.

In this case, it may be desirable to communicate via the second antenna module 1303 and/or the third antenna module 1305, not via the first antenna module 1301, and monitoring of the first antenna module 1301 may cause unnecessary power consumption. In this case, by switching the first antenna module 1301 and the second antenna module 1303 and/or the third antenna module 1305, the electronic device 1300 may set the second antenna module 1303 and/or the third antenna module 1305 as the serving antenna module, and may set the first antenna module 1301 as the non-serving antenna module, and may communicate.

As the electronic device 1300 monitors the second antenna module 1303 and/or the third antenna module 1305, the electronic device 1300 may change the monitoring period of the second antenna module 1303 and/or the third antenna module 1305. For example, the monitoring period of the second antenna module 1303 and/or the third antenna module 1305 may be reduced.

Figure 14:
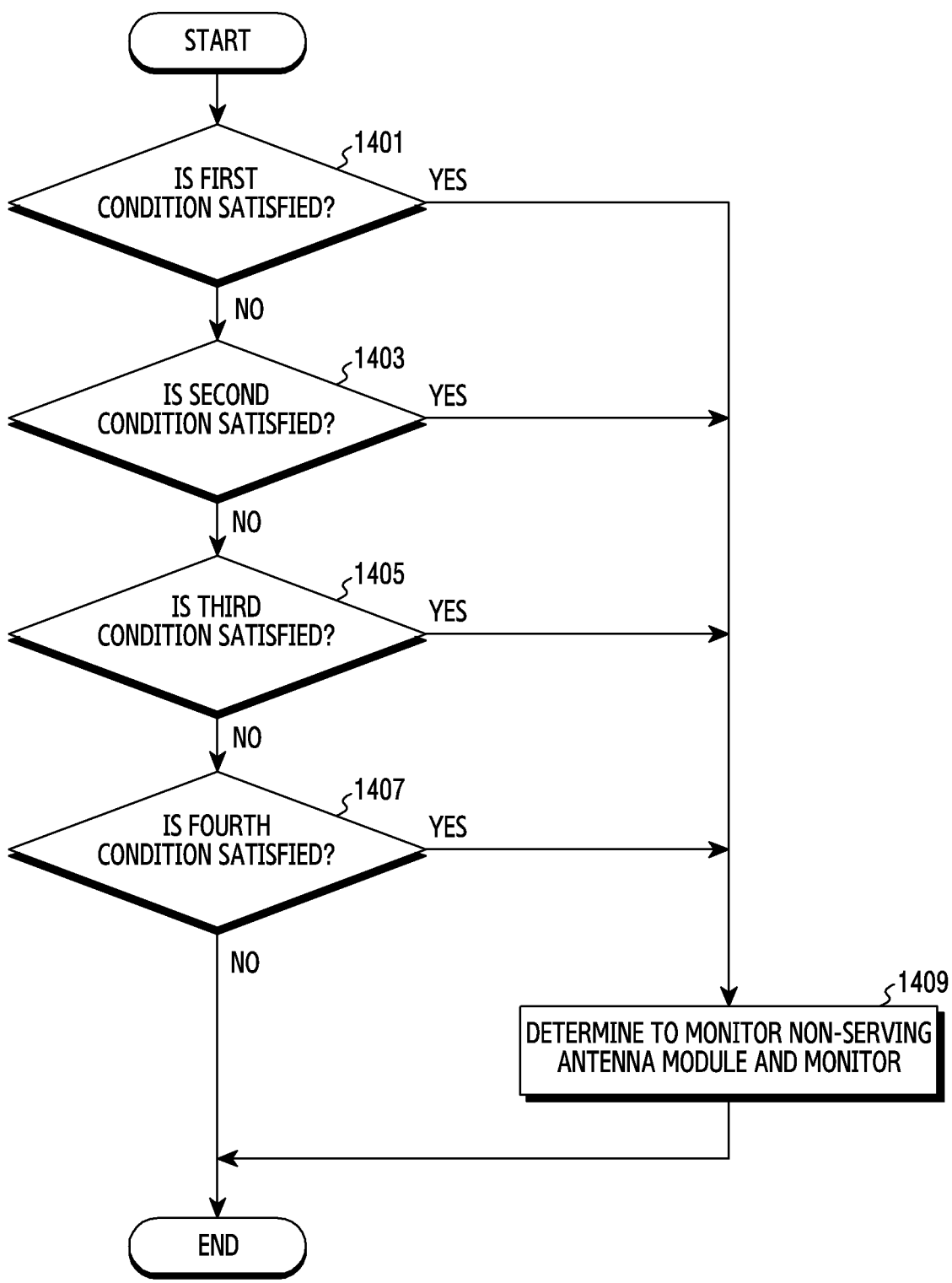
FIG. 14 is a flowchart illustrating a method of monitoring a second antenna module of an electronic device according to an embodiment.

FIG. 14 is a flowchart view illustrating a method further example of monitoring a second antenna module of an electronic device according to various an embodiments of the disclosure. Specifically, FIG. 14 illustrates another example of monitoring a non-serving antenna module in an electronic device according to an embodiment.

Referring to FIG. 14, in step 1401, the electronic device determines whether a first condition is satisfied. The first condition may include a condition on whether the electronic device receives a signal of a neighboring base station that is greater than or equal to a predetermined level. For example, the first condition may include a case in which it is identified that a difference between the first RSRP value and the second RSRP value, identified by the electronic device, is greater than or equal to a pre-defined threshold value. The first condition may correspond to determining to monitor the non-serving antenna module in the electronic device 1000 as described above with reference to FIGS. 10A and 10B.

When it is identified that the first condition is satisfied in step 1401, the electronic device monitors the non-serving antenna module in step 1409.

When the first condition is not satisfied in step 1401, the electronic device determines whether a second condition is satisfied in step 1403. The second condition may include a case in which the electronic device determines that a signal received from a serving base station is drastically reduced. For example, the second condition may include a case in which it is identified that a difference between a currently measured RSRP value and a reference RSRP value is greater than or equal to a pre-defined threshold value (th_RSRP_DROP). The second condition may correspond to the operation of determining to monitor the non-serving antenna module in the electronic device 1100 as described above with reference to FIGS. 11A and 11B.

When it is identified that the second condition is satisfied in step 1403, the electronic device monitors the non-serving antenna module in step 1409.

When the second condition is not satisfied in step 1403, the electronic device determines whether a third condition is satisfied in step 1405. The third condition may include a case in which the electronic device identifies a blockage in communication of the electronic device from a sensor. For example, the third condition may include a case in which a blockage in communication via a serving antenna module or a non-serving antenna module occurs or a case in which removal of the blockage in the communication via the serving antenna module or the non-serving antenna module, which currently exists, is identified from a sensor (e.g., a grip sensor or a proximity sensor) of the electronic device.

The third condition may correspond to the operation of monitoring the non-serving antenna module of the electronic device 1200 as described above with reference to FIGS. 12A and 12B.

When it is identified that the third condition is satisfied in step 1405, the electronic device monitors the non-serving antenna module in step 1409.

When it is identified that the third condition is not satisfied in step 1405, the electronic device determines whether a fourth condition is satisfied in step 1407. The fourth condition may include a case in which a predetermined time is elapsed from a last time of monitoring the non-serving antenna module. The fourth condition may correspond to the operation of monitoring the non-serving antenna module in the electronic device as described above with reference to FIGS. 13A and 13B.

When it is identified that the fourth condition is satisfied in step 1407, the electronic device monitors the non-serving antenna module in step 1409.

When it is identified that the fourth condition is not satisfied in step 1407, the electronic device finishes the operation of monitoring the non-serving antenna module, i.e., the method ends.

The first to fourth conditions in FIG. 14 are merely examples, and their determining order may be changed according to settings of the electronic device.

According to an embodiment, an operating method of an electronic device including a plurality of antenna modules may include identifying a first RSRP value and a second RSRP value by using at least one first antenna module; determining to monitor at least one second antenna module, based on the first RSRP value or the second RSRP value; and, in response to determining to monitor the at least one second antenna module, monitoring the at least one second antenna module, and the first RSRP value may be measured from a reference signal of a serving cell, and the second RSRP value may be measured from a reference signal of a neighboring cell.

Determining to monitor the at least one second antenna, module may include determining whether a difference between the first RSRP value and the second RSRP value is less than or equal to a threshold value.

Determining to monitor the at least one second antenna, module may include determining whether a difference between the first RSRP value and a reference RSRP value is greater than or equal to a pre-defined value, and the reference RSRP value may be determined based on an RSRP value of the reference signal of the serving cell which is measured before the first RSRP value is identified.

Determining to monitor the at least one second antenna module may include identifying occurrence or removal of a blockage in communication from a sensor.

The method may further include identifying the blockage in the communication, based on a strength of a signal transmitted to the serving cell or the neighboring cell.

The method may further include identifying the occurrence or removal of the blockage in the communication by using the at least one first antenna module or the at least one second antenna module.

The sensor may be a grip sensor, a proximity sensor, a rotation sensor, a movement sensor, or an acceleration sensor.

The method may further include determining to monitor the second antenna module, based on it being identified that a predetermined time has elapsed after a last time of monitoring the second antenna module.

The method may further include switching the at least one first antenna module and the at least one second antenna module.

Monitoring the at least one second antenna module may include reducing a monitoring period of the at least one second antenna module.

The method may further include performing a handover from the serving cell to the neighboring cell, based on the first RSRP value and a result of monitoring the at least one second antenna module.

The reference signal of the serving cell and the reference signal of the neighboring cell may include an SS/PBCH or a CSI-RS.

According to an embodiment, an electronic device may include a transceiver; a sensor; a plurality of antenna modules; and a processor operatively connected with the transceiver and the sensor, and the processor may be configured to identify a first RSRP value and a second RSRP value by using at least one first antenna module; determine to monitor at least one second antenna module based on the first RSRP value or the second RSRP value; and, in response to determining to monitor the at least one second antenna module, monitor the at least one second antenna module, and the first RSRP value may be measured from a reference signal of a serving cell, and the second RSRP value may be measured from a reference signal of a neighboring cell.

The processor may further be configured to determine whether a difference between the first RSRP value and the second RSRP value is less than or equal to a threshold value.

The processor may further be configured to determine whether a difference between the first RSRP value and a reference RSRP value is greater than or equal to a pre-defined value, and the reference RSRP value may be determined based on an RSRP value of the reference signal of the serving cell which is measured before the first RSRP value is identified.

The processor may further be configured to identify occurrence or removal of a blockage in communication from the sensor.

The processor may further be configured to identify the blockage in the communication, based on a strength of a signal transmitted to the serving cell or the neighboring cell.

The processor may further be configured to identify the occurrence or removal of the blockage in the communication by using the at least one first antenna module or the at least one second antenna module.

The sensor may be a grip sensor, a proximity sensor, a rotation sensor, a movement sensor, or an acceleration sensor.

The processor may further be configured to determine to monitor the second antenna module, based on it being identified that a predetermined time is elapsed after a last time of monitoring the second antenna module.

The processor may further be configured to switch the at least one first antenna module and the at least one second antenna module.

The processor may further be configured to reduce a monitoring period of the at least one second antenna module.

The processor may further be configured to perform a handover from the serving cell to the neighboring cell, based on the first RSRP value and a result of monitoring the at least one second antenna module.

The reference signal of the serving cell and the reference signal of the neighboring cell may include an SS/PBCH or a CSI-RS.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (e.g., the software module or software) may be stored in a random access memory, a non-volatile memory including a flash memory, a ROM (ROM), an electrically erasable programmable ROM (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a LAN, a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

According to the above-described embodiments of the disclosure, an electronic device including a plurality of antenna modules monitors to select, change, or replace an optimal serving beam, in order to enhance data transmission/reception quality and reduce power consumption.

Various effects achieved by the disclosure are not limited to those described herein, and other effects may be understood to those skilled in the technical fields to which the disclosure belongs, based on the descriptions provided above.

While certain embodiments have been described above in the detailed descriptions of the disclosure, it will be understood by those skilled in the art that various changes may be made therein without departing from the spirit and scope of the disclosure. Therefore, the scope of the disclosure should be defined not by the embodiments described above, but by the appended claims or the equivalents thereto.

What is claimed is:

1. A method performed by an electronic device in a wireless communication system, the method comprising:
    identifying, by using a first antenna module corresponding to a serving cell of a base station, a first reference signal received power (RSRP) value measured for the serving cell and a second RSRP value measured for a neighboring cell of the base station;
    identifying whether a difference between the first RSRP value and the second RSRP value is less than or equal to a first threshold for triggering monitoring of a plurality of second antenna modules;
    in case that the difference between the first RSRP value and the second RSRP value is greater than the first threshold:
    identifying whether a decrease of the first RSRP value is greater than a second threshold,
    in case that the decrease is less than or equal to the second threshold, determining not to monitor the plurality of second antenna modules,
    in case that the decrease is greater than the second threshold, determining to monitor the plurality of second antenna modules via performing RSRP measurements on the neighboring cell,
    in case that the difference between the first RSRP value and the second RSRP value is less than or equal to the first threshold:
        determining to increase a monitoring period of the first antenna module for an RSRP measurement on the serving cell, and
        determining to monitor the plurality of second antenna module via performing the RSRP measurement on the neighboring cell;
    identifying whether a third RSRP value obtained by performing an RSRP measurement on the neighboring cell using a second antenna module among the plurality of second antenna modules is greater than the first RSRP value;
    in case that the third RSRP value is greater than the first RSRP value:
        determining to stop monitoring the first antenna module, and
        switching an antenna module for a communication with the base station from the first antenna module to the second antenna module, and
    in case that the third RSRP value is less than or equal to the first RSRP value, maintaining the first antenna module as the antenna module for the communication,
    wherein the first RSRP value is measured based on a first reference signal of the serving cell, and the second RSRP value is measured based on a second reference signal of the neighboring cell,
    wherein the decrease of the first RSRP value is identified during a specific duration,
    wherein, when the monitoring of the plurality of second antenna modules is performed, the monitoring is performed sequentially based on priorities of the plurality of second antenna modules, and
    wherein the priorities of the plurality of second antenna modules are determined based on whether each of the plurality of second antenna modules is blocked by an external object.

2. The method of claim 1, wherein, in case that a difference between the first RSRP value and a reference RSRP value is greater than or equal to an additional threshold value, monitoring of the plurality of second antenna modules comprising the second antenna module is determined to be initiated,
    wherein the reference RSRP value is determined based on an RSRP value measured for the serving cell, and
    wherein the RSRP value is measured before the first RSRP value is identified.

3. The method of claim 1, wherein detection of a blockage by the external object is based on a strength of a signal transmitted to the serving cell or the neighboring cell.

4. The method of claim 1,
wherein a removal of the external object is identified by a sensor, and
wherein the sensor includes at least one of a grip sensor, a proximity sensor, a rotation sensor, a movement sensor, or an acceleration sensor.

5. The method of claim 1, wherein, in case that a predetermined time has elapsed after a last time of monitoring the second antenna module, monitoring of the second antenna module is determined to be initiated.

6. The method of claim 1, wherein, in case that the antenna module for the communication is switched from the first antenna module to the second antenna module, a monitoring period of the second antenna module reduces.

7. The method of claim 1, further comprising:
in case that the antenna module for the communication is switched from the first antenna module to the second antenna module, performing a handover from the serving cell to the neighboring cell.

8. The method of claim 1, wherein each of the first reference signal and the second reference signal comprises a synchronization signal/physical broadcast channel (SS/PBCH) or a channel state information-reference signal (CSI-RS).

9. An electronic device in a wireless communication system, the electronic device comprising:
a transceiver;
a plurality of antenna modules including a first antenna module and a plurality of second antenna modules including a second antenna module; and
a processor configured to:
identify, by using the first antenna module corresponding to a serving cell of a base station, a first reference signal received power (RSRP) value measured for the serving cell and a second RSRP value measured for a neighboring cell of the base station,
identify whether a difference between the first RSRP value and the second RSRP value is less than or equal to a first threshold for triggering monitoring of the plurality of second antenna modules,
in case that the difference between the first RSRP value and the second RSRP value is greater than the first threshold;
identify whether a decrease of the first RSRP value is greater than a second threshold,
in case that the decrease is less than or equal to the second threshold, determine not to monitor the plurality of second antenna modules,
in case that the decrease is greater than the second threshold, determine to monitor the plurality of second antenna modules via performing RSRP measurements on the neighboring cell,
in case that the difference between the first RSRP value and the second RSRP value is less than or equal to the first threshold:
determine to increase a monitoring period of the first antenna module for a RSRP measurement on the serving cell, and
determine to monitor the plurality of second antenna module via performing the RSRP measurement on the neighboring cell,
identify whether a third RSRP value obtained by performing an RSRP measurement on the neighboring cell using a second antenna module among the plurality of second antenna modules is greater than the first RSRP value,
in case that the third RSRP value is greater than the first RSRP value:
determine to stop monitoring the first antenna module, and
switch an antenna module for a communication with the base station from the first antenna module to the second antenna module,
in case that the third RSRP value is less than or equal to the first RSRP value, maintain the first antenna module as the antenna module for the communication,
wherein the first RSRP value is measured based on a first reference signal of the serving cell, and the second RSRP value is measured based on a second reference signal of the neighboring cell,
wherein the decrease of the first RSRP value is identified during a specific duration,
wherein, when the monitoring of the plurality of second antenna modules is performed, the monitoring is performed sequentially based on priorities of the plurality of second antenna modules, and
wherein the priorities of the plurality of second antenna modules are determined based on whether each of the plurality of second antenna modules is blocked by an external object.

10. The electronic device of claim 9, wherein, in case that a difference between the first RSRP value and a reference RSRP value is greater than or equal to an additional threshold value, monitoring of the plurality of second antenna modules comprising the second antenna module is determined to be initiated,
wherein the reference RSRP value is determined based on an RSRP value measured for the serving cell, and
wherein the RSRP value is measured before the first RSRP value is identified.

* * * * *